United States Patent [19]
Katzenberger

[11] Patent Number: 5,970,496
[45] Date of Patent: *Oct. 19, 1999

[54] METHOD AND SYSTEM FOR STORING INFORMATION IN A COMPUTER SYSTEM MEMORY USING HIERARCHICAL DATA NODE RELATIONSHIPS

[75] Inventor: Gary Shon Katzenberger, Woodinville, Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/712,909

[22] Filed: Sep. 12, 1996

[51] Int. Cl.$^6$ ...................................................... G06F 17/30
[52] U.S. Cl. ................................................. 707/102; 707/2
[58] Field of Search ................................... 707/100, 101, 707/103, 104, 3, 4, 5, 6, 2, 102; 395/672

[56] References Cited

U.S. PATENT DOCUMENTS

| | | | |
|---|---|---|---|
| 5,310,349 | 5/1994 | Daniels | 345/350 |
| 5,430,870 | 7/1995 | Stanton | 707/2 |
| 5,613,134 | 3/1997 | Lucus | 707/526 |
| 5,621,874 | 4/1997 | Lucus | 707/526 |
| 5,640,556 | 6/1997 | Tamura | 707/10 |
| 5,704,017 | 12/1997 | Heckerman | 395/61 |
| 5,742,821 | 4/1998 | Prasanna | 395/672 |

OTHER PUBLICATIONS

Brockschmidt, Kraig, *Inside Ole Second Edition*, 1995, pp. iii–xvii, 35–39, and 341–400.

*Primary Examiner*—Thomas G. Black
*Assistant Examiner*—Diane D. Mizrahi
*Attorney, Agent, or Firm*—Jones & Askew, LLP

[57] ABSTRACT

A method, system, and data structure for storing information in a computer system memory using a directed acyclic graph structure having related data nodes. Any node can "own" other nodes in hierarchical relationships. Data is stored in a file structure with (1) a heap for storing chunks or nodes of data in memory locations, and (2) an index containing information about the relationships between nodes. Each node is referenced and accessed by information stored in the index. Each ownership relationship between nodes is referenced uniquely by the triple consisting of the identification of the parent node, the identification of the child node and a child identification value. The inclusion of a child identification value in the triple allows a node to be a child of another node a multiplicity of times. The index is a table of entries, one entry for each node. Each entry contains the identifier of the node and, if there are relationships with other nodes, a list of one or more references to child nodes. A data file constructed in accordance with the invention allows hierarchical data structures, multiple use of the same data, and cross-ownership of data, resulting in more efficient usage of memory.

16 Claims, 14 Drawing Sheets

PRIOR ART - OLE COMPOUND FILES TREE

HIERARCHY OF CHUNK NODES WITH PARENT/CHILD RELATIONSHIP

INDEX TABLE FOR STORAGE OF CHUNK ATTRIBUTES AND CHILD REFERENCE INFORMATION

INDEX 830

| Chunk attributes array for node n (CA$_n$) | Child list for node n (ctg, cno, chid) where chid = child identifier or ID | | | | | | | | | | |
|---|---|---|---|---|---|---|---|---|---|---|---|
| CA$_A$ | (ctg E, cno E, 1) | (ctg E, cno E, 2) | (ctg E, cno E, 3) | (ctg E, cno E, 4) | (ctg F, cno F, 1) | (ctg G, cno G, 1) | ... | | | | |
| CA$_B$ | (ctg G, cno G, 1) | (ctg H, cno H, 1) | | | | | | | | | |
| CA$_C$ | (ctg G, cno G, 1) | (ctg H, cno H, 1) | | | | | | | | | |
| CA$_D$ | (ctg J, cno J, 1) | | | | | | | | | | |
| CA$_E$ | | | | | | | | | | | |
| CA$_F$ | | | | | | | | | | | |
| CA$_G$ | (ctg I, cno I, 1) | (ctg J, cno J, 1) | | | | | | | | | |
| CA$_H$ | | | | | | | | | | | |
| CA$_I$ | | | | | | | | | | | |
| CA$_J$ | | | | | | | | | | | |
| ... | | | | | | | | | | | |

905a → CA$_A$, 905b → CA$_B$, 905c → CA$_C$, ..., 905n → CA$_J$ 908 denotes the child list region.

CA = ( ctg, cno, OFF, length, isLoner, numChildren, numParents, com , rti)

where
ctg = chunk type or tag
cno = chunk number
OFF = offset
length = chunk length (size)
isLoner = flag to indicate loner status
numChildren = number of children
numParents = number of parents
com = flag to indicate compressed chunk or not
rti = run time identifier or ID

FIG. 9

ADD A NODE

```
/ / Add a node:
Add (ctg, cno, length)

{
        allocate in the heap a contiguous block of 'length' bytes
        insert CA (ctg, cno) in the index.
        fill in the CA with the correct information
}
```

ADD A PARENT/CHILD RELATIONSHIP

```
// Add a parent / child relationship:
AddParentChild (ctgPar, cnoPar, ctgChd, cnoChd, chid)
{
        find CA (ctgPar, cnoPar)
        insert (ctgChd, cnoChd, chid) in child list of CA
        increment CA.numChildren find CA (ctgChd, cnoChd)
        increment CA.numParents
}
```

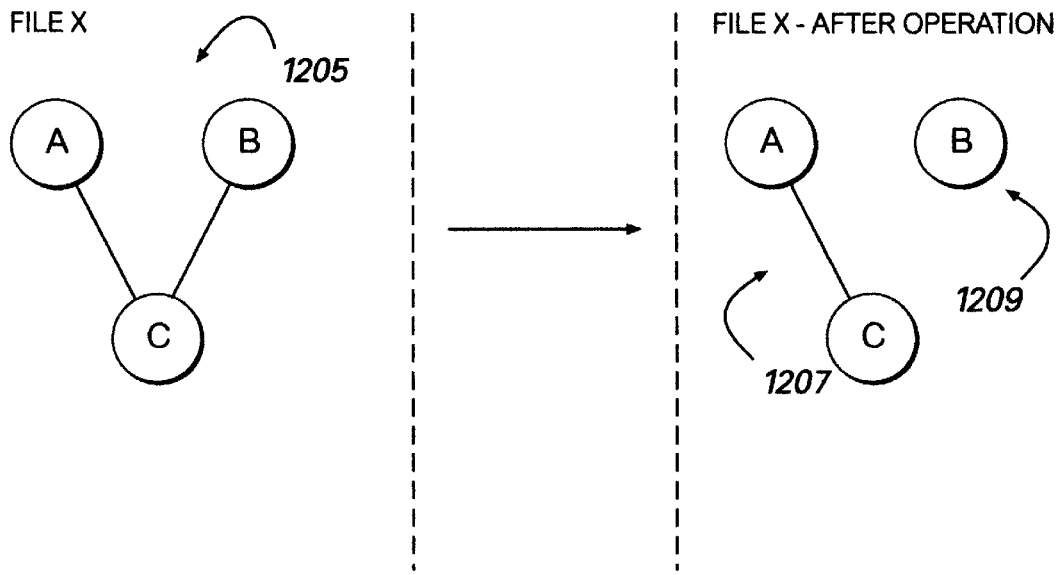

DELETE   PARENT/CHILD   RELATIONSHIP

```
// Delete a parent / child relationship:
DeleteParentChild (ctgPar, cnoPar, ctgChd, cnoChd, chid)
{
        find CA (ctgPar, cnoPar)
        delete (ctgChd, cnoChd, chid) from the child list of CA
        decrement CA.numChildren find CA (ctgChd, cnoChd)
        decrement CA.numParents
        if (CA.numparents is zero and CA.isloner is false)
                _DeleteCore (ctgChd, cnoChd)
}

// Core delete operation (helper function for delete and
//      DeleteParentChild)
_DeleteCore (ctg, cno)
{
        find CA (ctg, cno)
        for each child (ctgChd, cnoChd, chid) of CA
                DeleteParentChild (ctg, cno, ctgChd, cnoChd, chid)

add heap block for CA to free map
        delete CA from index
}
```

FIG.12

DELETE A NODE

```
/ / Delete a node:
Delete (ctg, cno)

{
        find CA (ctg, cno)
        set CA.isLoner to false
        if (CA.numParents is zero)
                _DeleteCore (ctg, cno)
}
```

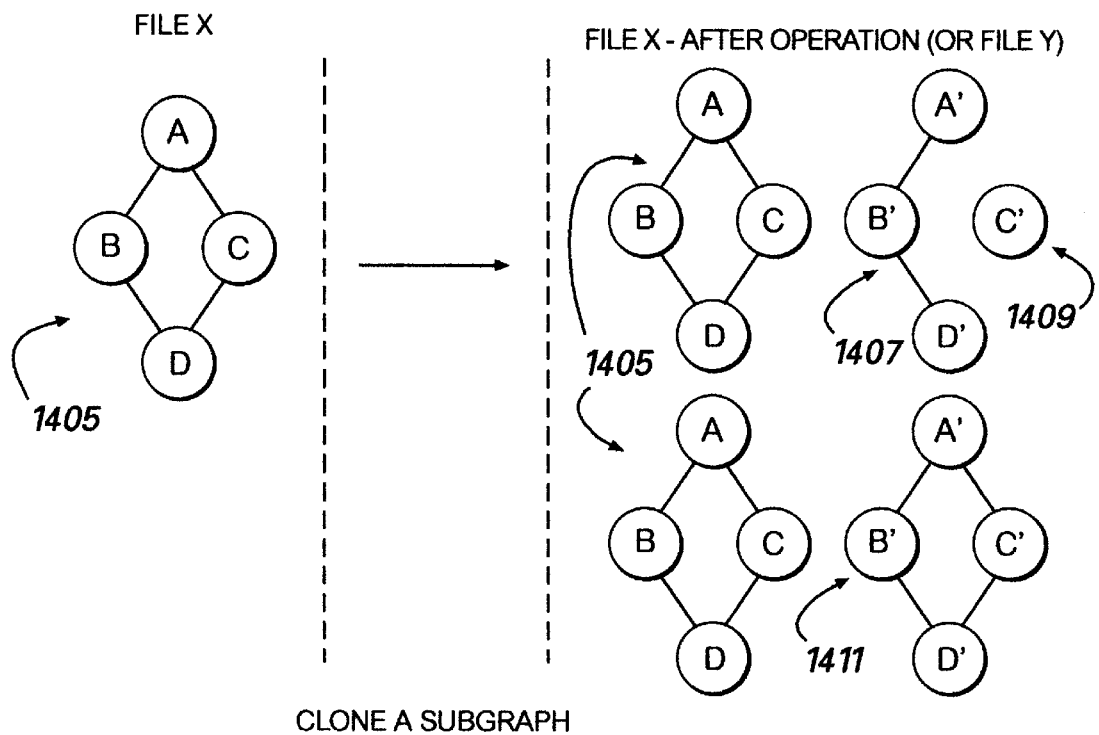

CLONE A SUBGRAPH

```
/ / Clone a subgraph (does not using existing nodes)
/ / returns cno of the destination chunk
clone (ctg, cno, fileDst)
{
        create mapping list with no entries
        return _CloneCore (ctg, cno, fileDst, list)
}

/ / Core clone operation (helper function for Clone)
/ / returns cno of the destination chunk
_CloneCore (ctg, cno, fileDst, list)
{
        if (list contains MAP entry with source (ctg, cno))
                return MAP.cnoDst
        find CA (ctg, cno)
        if ((ctg, cno) exists in fileDst)
                choose cnoDst so that (ctg, cnoDst) is not in fileDst
        else
                set cnoDst = cno
        fileDst.Add (ctg, cnoDst, CA.length)
        copy data for node
        copy relevant node attributes including rti
        add MAP (ctg, cno, cnoDst) to list for ( each child (ctgChd, cnoChd, chid) of CA)
                set cnoChdDst = _CloneCore (ctgChd, cnoChd, fileDst, list)
                fileDst.AddParentChild (ctg, cnoDst, ctgChd, cnoChdDst, chid)

return cnoDst
}
```

FIG.14

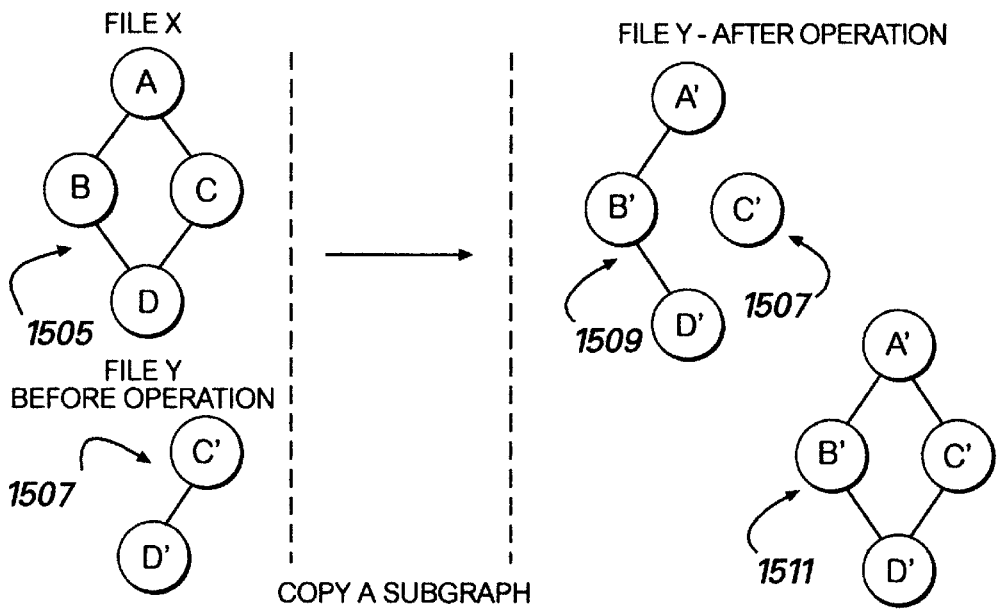

COPY A SUBGRAPH

```
// Copy a subgraph, using existing nodes when possible
// returns cno of the destination chunk
copy (ctg, cno, fileDst)
{
        if fileDst equals this file
                return cno
        create mapping list with no entries
        return _CopyCore (ctg, cno, fileDst, list)
}

// Core copy operation (a helper function for copy)
// returns cno of the destination chunk
_CopyCore (ctg, cno, fileDst, list)
{

// Core copy operation ( a helper function for copy)
// returns cno of the destination chunk
_CopyCore (ctg, cno, fileDst, list)
{
        if (list contains MAP entry with source (ctg, cno))
                returnMAP.cnoDst
        find CA (ctg, cno)
        if (CA.rti is zero)
                set CA.rti to the next available (unique) rti
                go to CantShare
        for each node (ctg, cnoDst) in fileDst With rti equal to CA.rti
                if (ctg, cno) has subgraph equivalent to that of
                        fileDst (ctg, cnoDst)
                        add MAP (ctg, cno, cnoDst) to list
                        return cnoDst
:CantShare:
        if ((ctg, cno) exists in fileDst)
                choose cnoDst so that (ctg, cnoDst) is not in fileDst
        else
                set cnoDst = cno
        fileDst.Add (ctg, cnoDst, CA.length)
        copy data for node
        copy relevant node attributes including rti
        add MAP (ctg, cno, cnoDst) to list
        for (each child (ctgChd, cnoChd, chid) of CA)
                set cnoChdDst = _CopyCore (ctgChd, cnoChd, fileDst, list)
                fileDst.AddParentChild (ctg, cnoDst, ctgChd, cnoChdDst, chid)
        return cnoDst
}
```

FIG. 15

METHOD AND SYSTEM FOR STORING INFORMATION IN A COMPUTER SYSTEM MEMORY USING HIERARCHICAL DATA NODE RELATIONSHIPS

TECHNICAL FIELD

The present invention relates generally to the field of computer systems, and relates more specifically to a method, system, and data structures for storing information in computer system memory using data nodes arranged in a hierarchical directed acyclic graph.

BACKGROUND OF THE INVENTION

In many computer programs, a single computer file is used to store many different pieces of data, referred to herein as chunks. Typically, different pieces of data, or chunks, are related in the sense that a chunk is subordinate to or owned by another chunk. For example, a page layout program may have the notion of a "frame" as an area in a document where information is to be displayed on a page of the document. Each frame has certain attributes, collectively known as "frame data", associated with the frame, such as the location, shape, contents, border style, etc. This frame data is typically stored as a chunk of data in a computer data file associated with the document. Some of these frame attributes may be references to other chunks of data that are stored separate from the frame data. For example, the "contents" attribute may be a reference to the information that should be displayed in the frame, such as a picture or text. Similarly, the "border" attribute may be a reference to the border data, which is stored in a distinct chunk within the document file. The content chunk and border chunk are subordinate to, or owned by, the frame chunk in that the frame chunk references them.

A common operation on a chunk of data, such as the frame chunk described above, is to copy it and all of its subordinate chunks to a different computer data file. Because of inefficiencies in the storage mechanism, the code to perform this copy operation typically needs to know how the frame chunk references other chunks, where the locations of these references are stored, and how to resolve those references to find the actual data for the subordinate chunks. If a program also needed to copy other types of chunks of data, distinct code must be written to perform this type of copy operation.

A typical prior art data structure, such as OLE Compound Files distributed by Microsoft Corporation, utilizes a heterogeneous file structure where a node is either a "storage" or a "stream," but not both. This data structure is described in the book by Kraig Brockschmidt, INSIDE OLE (Second Edition), Microsoft Press, ISBN 1-55615-843-2. A storage is a computer data item that stores a list of references to other discrete items of information, each of which is either another storage or a data stream. These referenced items are said to be children of the storage and the storage is the parent of each of these items. A stream is a data item comprising a "chunk" of information, for example a picture. Nodes in an OLE Compound File form a tree, where every node except the top level node has a unique parent node. The top level or root node has no parent. All internal nodes, that is nodes that have at least one child, are storages. Leaf nodes, that is nodes having no children, may either be streams or empty storages. Note that a stream cannot have children and a storage cannot have data other than its list of children. Also. a child node cannot be shared by more than one storage.

Referring in this regard to FIG. 1, a typical OLE Compound File may be represented in a graphical fashion as a structure or tree 5 comprising related nodes 7. An OLE Compound File may include a number of storages and streams. For example, in FIG. 1 the node A, being a storage, contains nodes B, C, and D. Node B is itself a storage containing data streams E and F and storage G. Storage G is empty. Node C is a data stream; node D is a storage containing nodes H and I, of which H is a storage containing streams J and K.

Because of the tree-based nature of the structure, it is possible to establish an ownership relationship between two related nodes. However, the tree structure is too restrictive. The tree structure of an OLE Compound File does not allow a stream to be shared by more than one storage. Nor is a node allowed to both contain data and have children.

For example, if the data file 5 represented by the tree shown in FIG. 1 contained redundant information, e.g., if streams F and I are identical, there is no convenient way to store just one copy of the information and still use the information in both contexts. For example, assume that node A represents a page layout program document, nodes B and D represent individual frames within that document and nodes F and I represent the pictures to be displayed by these frames. If the two frames are to display the same picture, the picture data must be duplicated in the file—it must exist in both stream F and stream I. Moreover, since the storage B can contain no data, a special stream, say E, is required to store additional frame attributes such as size and location of the frame.

Suppose now that node H represents the border to use for frame D, stream J is the picture to use for all four corners of the border and stream K is the picture to use for all four sides of the border. The tree structure cannot reflect this multiple usage. The tree structure cannot distinguish between this case and the case where stream J is to be used for the top left corner of the border and stream K is to be used for all other corners and all sides.

Accordingly, the use of a tree-based file structure leads to certain inefficiencies in data storage for some types of computer application programs. These inefficiencies are most pronounced where ownership relationships can be established between data items, and a single data item may be used in more than one context. There is thus a need for a computer data file storage method and system that allows for establishment of ownership relationships between data items, without the restriction that a node have a unique owner. It would also be convenient if the method would allow multiple ownership relationships between two nodes and allow nodes to both contain data and own other nodes.

SUMMARY OF THE INVENTION

The present invention provides a new data file structure for use in a computer system that involves use of data nodes related via a directed acyclic graph (DAG). In a system constructed in accordance with the present invention, a data storage file is arranged as a directed acyclic graph (DAG) of data nodes. In contrast to OLE Compound Files, the relationship graph is not restricted to being a tree, and nodes of the DAG can simultaneously play the role of a stream and a storage. That is, nodes can simultaneously contain data and "own" other nodes. A "parent" node can have any number of "child" nodes and a child node can have any number of parents. Additionally, a parent may own a child node a multiplicity of times, each ownership relationship being identified by a child id value.

Briefly described, the present invention contemplates a method and system wherein data is stored in a file structure with a heap for storing "chunks" or nodes of data in memory locations, together with information about the locations of the chunks in the heap and the relationships between data chunks or nodes. The memory locations are not necessarily contiguous. The information about relationships between data nodes is stored in an index comprising a plurality of index entries including information indicating predetermined type attributes of each data node and identification information identifying the data node.

The data nodes are conceptually associated with one another in the file structure via a directed acyclic graph (DAG). A DAG can be constructed for any given data structure to graphically illustrate the relationship between data nodes. A node can be a "parent" that can own one or more child nodes. Any node can be a data node, and/or can simultaneously contain information that points to other child nodes, thereby effectively serving as a directory or subdirectory. This is in contrast to prior art data structures wherein nodes can either be data or directories, but not both at the same time.

Efficiencies in data storage are obtained by use of the DAG structure. Relationships may be established between various data items, and data processing operations on a parent node may be carried out on child nodes associated with the parent node quickly and efficiently. The resultant DAG structure has many useful features, for example cross-ownership or "sharing" can be established, as well as multiple ownership of a node.

A "parent/child" relationship occurs when a node (a "child" node) has one or more parents, indicating a hierarchical relationship. Advantageously, certain data processing operations carried out on a designated node are readily carried out on any related child nodes, because the index allows rapid and efficient location and processing of the child nodes associated with the parent node on which the operation is called.

A "cross-ownership" or "sharing" occurs when a child node has more than one parent node. Sharing of the data in a node by two or more parent nodes allows for efficiencies in data storage, since the memory occupied by the relationship information is likely to be much less than the memory occupied by multiple copies of the same data.

A "multiple" ownership situation occurs when a single child node is owned a plurality of times by a parent, thereby effectively appearing as multiple data items. In other words, a multiple relationship indicates that one node owns another node multiple times.

Each node or chunk is referenced by a unique name. In the preferred embodiment, the name consists of two values, a chunk type or tag attribute (ctg) indicating the type of information stored in the chunk, and a chunk number (cno) which distinguishes a chunk from other chunks of the same type.

Each ownership relationship between nodes is referenced by an identification number known as a "child ID" (chid). The chid can be used to indicate how a child node is used by a parent. If a chunk is owned a multiplicity of times by another chunk, the chid values associated with these ownership relationships must be distinct. More precisely, an ownership relationship is uniquely identified by the data triple consisting of the name of the parent, the name of the child and the child id value, (Parent, Child, chid). In the preferred embodiment of the present invention, where the name of a node is a pair of values consisting of a ctg and a cno, this triple can be considered to be equivalent to the 5-tuple of values (ctgParent, cnoParent, ctgChild, cnoChild, chid).

The index is a table of entries, one for each chunk. In the preferred embodiment, the entries in the index are sorted by chunk name to allow efficient access to the entry. The entry for a chunk contains the attributes of the chunk, including the name of the chunk, the location of the chunk's data in the heap, the number of parents of the chunk, the number of children of the chunk, a list of the child references stored as pairs of chunk names and chid values, and other attributes to be described later.

Utilizing a file structure as described herein, the present invention dramatically reduces the memory requirements for a data file containing redundant data by providing a concise and efficient file storage structure that preserves relationships between chunks of data, facilitating reuse and multiple use of chunks of data, and eliminating the need to store similar types of data many times as in a conventional tree-type file structure.

Accordingly, it is an object of the present invention to provide a method and system for increasing the storage efficiency of a data file for computer application programs by providing a file structure that leads to greater efficiencies in data storage requirements.

It is another object of the present invention to provide an improved method and system of reducing file size in a computer application program.

It is still another object of the present invention to provide an efficient method and system for creating relationships between chunks of data within a computer file structure by the utilization of similar data types, and the result in increased efficiencies in data storage requirements and processing results from accessing of the data from these files.

These and other objects, features, and advantages of the present invention may be completely understood through the detailed description of the preferred embodiment of the invention provided below and by inspection and review of the accompanying drawing figures.

BRIEF DESCRIPTION OF THE DRAWINGS

FIG. 9 is a table illustrating the index utilized to store chunk attributes in accordance with the preferred embodiment of the present invention.

FIG. 12 is an exemplary directed acyclic graph and pseudocode listing for a "delete a parent/child relationship" data processing operation.

FIG. 14 is an exemplary directed acyclic graph and pseudocode listing for a "clone a subgraph" data processing operation.

FIG. 15 is an exemplary directed acyclic graph and pseudocode listing for a "copy a subgraph" data processing operation.

DETAILED DESCRIPTION OF THE PREFERRED EMBODIMENTS

The invention is directed toward a structured file storage mechanism that reflects the various relationships that may exist between chunks of data. Having a unified mechanism for chunks to reference other chunks within the same data file simplifies common file operations. To avoid the inefficiencies of prior art data structures, it is desirable for the structured storage mechanism to allow any given chunk to be subordinate to any number of other chunks. If an ownership relationship is reflected in the storage mechanism so that there is a single way for one chunk to reference another chunk, one skilled in the art can easily write generic code to copy any chunk and its subordinate chunks to another data file.

As an example, suppose a document has two frames that display the same contents or have the same border. A typical prior art application will store the content information or border for each individual page. Consider, for example, a rectangular border that consists of a list of eight pictures, one for each corner and one for each side. Specifically, the picture used for a side of the border would be repeated along the side until the side is filled. In this way, a border could be expanded to any size. It is convenient to store these eight pictures in their own chunks, which are all owned by the border chunk, so that they can be manipulated independent of any borders that may use them. For example, if a utility program is written to edit picture chunks, it could be used to edit the pictures used by a border without having to be customized to understand how borders are stored. Storing the pictures in their own chunks also allows multiple borders to use the same pictures.

For some borders, two or more of these eight pictures may be the same. For example, a particular border may use the same picture for all four corners and all four sides. Another border might use the same picture for the four corners, but different pictures for the four sides. This suggests that the structured storage mechanism should allow a single chunk to be owned a multiplicity of times by another chunk.

The code that displays a border, given a border chunk, needs to be able to determine which owned picture chunk is used for which corner or side of the border. Thus, each ownership relationship should have an identifier or name associated with it to distinguish it from other ownership relationships. In this application, such an identifier or name is referred to as a child id. For example, the eight picture chunks that are owned by a border chunk could have child id values of 0, 1, . . . , 7. A child id value of 0 could be taken to mean the upper left corner, 1 could mean the top edge, 2 the upper right corner, 3 the right edge and so on. The structured storage mechanism should manage these child id values and preserve them when copying a chunk and its subordinate chunks.

Figure 1:
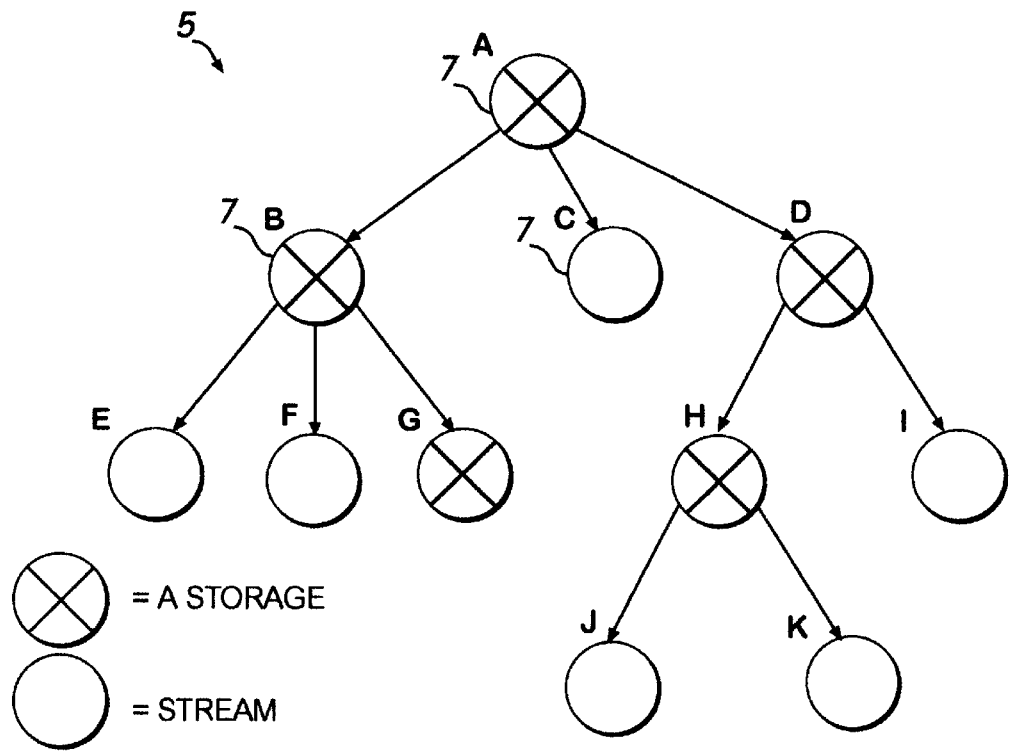
FIG. 1 is a node diagram of a prior art data structure having data nodes that are either directories or streams but not both and where the relationship graph between nodes is restricted to being a tree.
Figure 2:
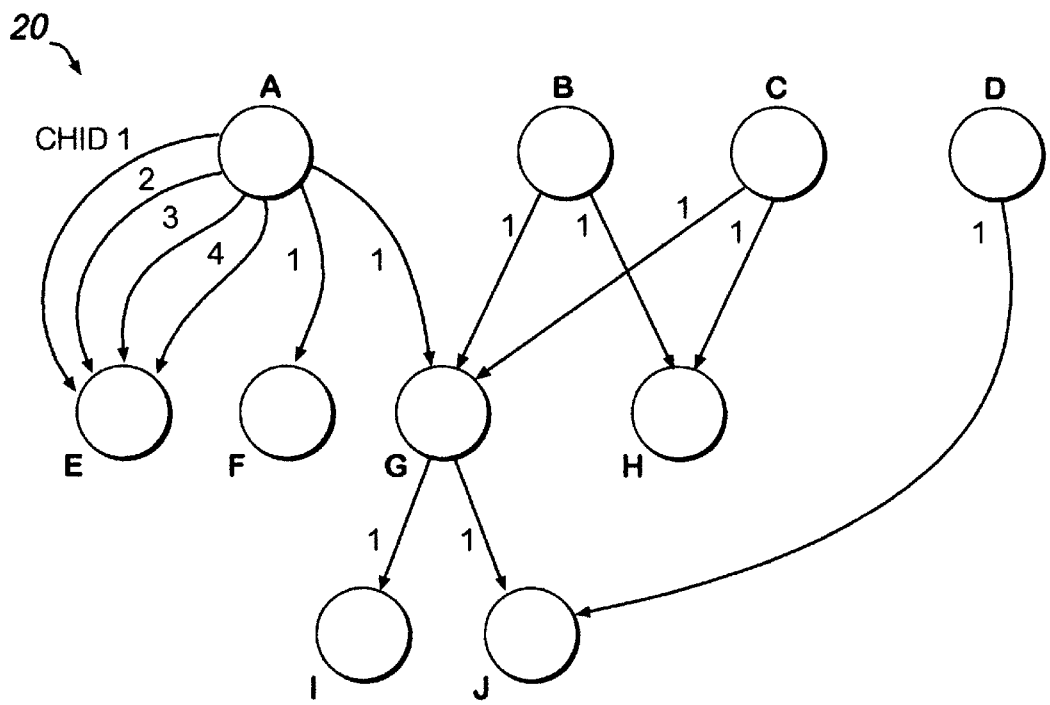
FIG. 2 is a directed acyclic graph (DAG) illustrating various types of relationships that can be effected in a system constructed in accordance with the preferred embodiment of the present invention.

FIG. 2 illustrates a directed acyclic graph (DAG) 20 forming the conceptual basis for the arrangement of data nodes or chunks that are used to organize data and store the data in a file structure in a computer system constructed in accordance with the present invention. Briefly described, the present invention allows the user of a computer system to designate relationships between data items, also called "chunks" or "nodes", establish these relationships by creating new data chunks, adding and deleting parent/child relationships, copying data chunks, cloning data chunks, or deleting data chunks, and storing the arranged and organized data in a file structure in the computer system's memory in an efficient, space-conserving manner.

The relationships between data nodes are important because they allow data chunks to be re-used by other data chunks in a hierarchical fashion. FIG. 2 illustrates various aspects of the parent/child relationship that can be established in the present invention. Generally, nodes are related in a "parent/child" relationship that indicates that a node (a "child" node) has one or more parents. For example, the node A in FIG. 2 has child nodes E, F, and G. Similarly, the node B has child nodes G and H. In turn, node G has child nodes I and J.

The disclosed data structure facilitates certain types of data operations because child nodes are easily accessed from a parent node. For example, if there is a need to reuse a data item a plurality of times, all that is required is the establishment of plural parent/child relationships.

In other cases, it is desired that an operation to a parent node should affect all related child nodes. For example, basic file manipulation operations such as copy, clone, and delete are facilitated because with these operations it is generally intended that an operation to a parent node should affect the related child nodes. Advantageously, any data processing operation that is carried out on a parent node can easily be carried out on related child nodes quickly and efficiently.

The relationship between data nodes is that of "parent/child". In a parent/child relationship, a child data node is related to a parent data node. Any data processing operations to the parent data node can, if desired, affect any child data nodes of the parent. The data processing operations to the nodes are carried out by inspecting the index of the file structure to determine what child nodes exist for the parent, and, if required, carrying out the data processing operations of the parent also for the child nodes.

The establishment of parent/child relationships can result in several variations and arrangements in the preferred embodiment. A "cross-ownership" situation occurs when a child node has more than one parent. For example, in FIG. 2 node G has multiple parents A, B, and C. Similarly, node H has multiple parents B and C. When this arrangement occurs, it is not necessarily true that all data processing operations on a parent necessarily should or will affect all child nodes. A good example of this is a delete operation. For example, if the data associated with node C was to be deleted, it would not be appropriate to delete nodes G or H, because these nodes are also owned by (i.e., are children of) node B. On the other hand, a delete operation to node A could, if desired, result in the deletion of nodes A, E, and F, but not node G since node G is cross-owned by nodes B and C. Nodes E and F have no other parents than A, while node G has a cross-ownership relationship with node B and C, and therefore would not be deleted if node A is deleted.

A "multiple ownership" situation occurs when a single child node is owned a plurality of times by a parent, thereby effectively appearing as a multiple data item. This is illustrated in FIG. 2 by the four multiple arrows extending from parent node A to child node E. The four arrows indicate there are four separate relationships established between node A and node E, indicating that the data item represented by E is utilized four separate times in conceivably four different manners. An example of this intuitively might be that of an automobile, where node A represents a 3D model of the body of the automobile, and node E represents a rendered 3D model of a tire. The model of the tire could be stored one time (node E), but utilized four separate times when displayed in conjunction with the 3D model of the body of the automobile.

A "loner" situation occurs when a node has no parents. In the preferred embodiment, a loner flag (isLoner) is stored as an attribute of a node, to indicate whether or not a node needs parents. Any node can have its loner flag set to true. The loner flag indicates that when and if all of the node's parents disown the node—either because they were deleted or just do not need the node any more—the node should not be deleted. All nodes at the top of a DAG must have their loner flag set to true; other nodes may also have their loner flag set to true.

On the other hand, when a node's loner flag is not true, it will be deleted in response to certain operations, to be described.

For file management purposes, a node will be deleted via a delete operation if it is not a loner and has no parents. That is, the node will be deleted if its isLoner attribute is false and no other node owns it. A node must be indicated as a loner in the preferred embodiment to indicate that it can be at the top of the DAG hierarchy and should not be deleted as a stray node. For example, in FIG. 2 if the isLoner attributes of nodes E and F are true and node A is deleted, nodes E and F would not be deleted. However, if the isLoner attributes of nodes E and F are false and node A is deleted, nodes E and F would also be deleted because they have no other parents and are not loners.

Figure 3:
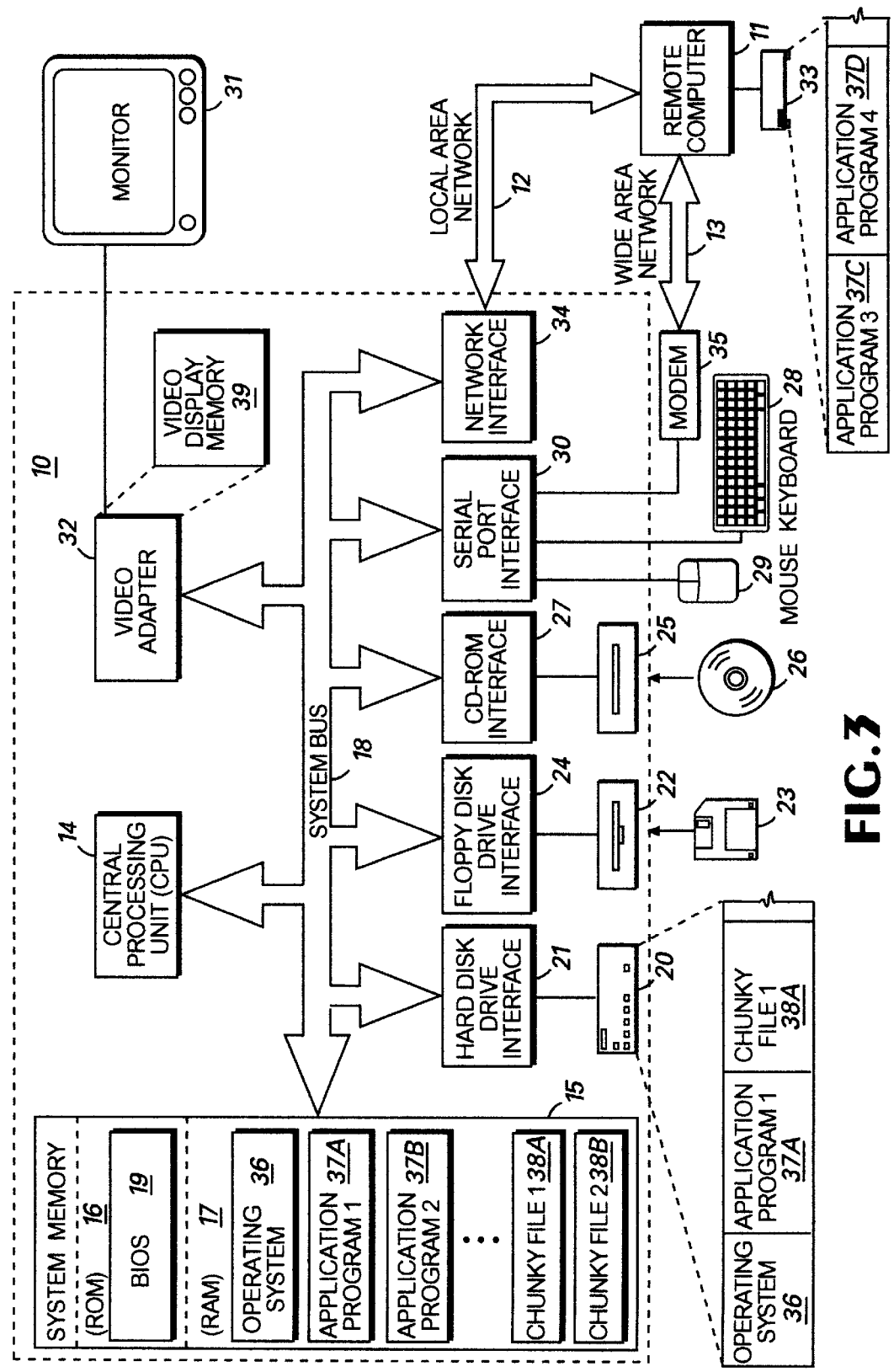
FIG. 3 is a block diagram of a computer system suitable for use in implementing the present invention.

With the foregoing background in mind, turn next to FIG. 3 for discussion of a computer system suitable for carrying out the methods of the present invention. Although the preferred embodiment will be generally described in the context of an application program and an operating system running on an IBM-compatible personal computer (PC), those skilled in the art will recognize in the present invention can also be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a standalone manner or remotely in a client/server manner. Examples of such distributed computing environments include local area networks (LAN) of an office, enterprise-wide area networks (WAN), and the global Internet. Accordingly, it will be understood that the terms computer, operating system, and application program generally include all types of computers and program modules designed for them.

The detailed description which follows is represented largely in terms of processes and symbolic representations of operations by conventional computer components, including a central processing unit (CPU), memory storage devices for the CPU, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communication network. Those skilled in the art will recognize that such a communications network may be a local area network or may be a geographically dispersed wide area network, such as the Internet or an enterprise-wide computer network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, works, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, altering, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring in this regard to FIG. 3, various aspects of the preferred computing environment in which the present invention is designed to operate are illustrated. Those skilled in the art will immediately appreciate that FIG. 3 and the associated discussion are intended to provide a brief, general description of the preferred computer hardware and program modules, and that additional information is readily available in the appropriate programming manuals, user's guides, and similar publications.

FIG. 3 illustrates a conventional personal computer 10 suitable for supporting the operation of the preferred embodiment of the present invention. If desired, the personal computer 10 may operate in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 may include a central processing unit (CPU) 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the CPU 14 by a system bus 18. The basic input/output system (BIOS) 19 for the personal computer 10 is stored in ROM 16. Those skilled in the art will recognize that the BIOS 19 is a set of basic routines that helps to transfer information between elements within the personal computer 10.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using a keyboard 28 and/or pointing device, such as a mouse 29, which are connected to the system bus 18 via a serial port interface 30. Other types of pointing devices (not shown in FIG. 3) include track pads, track balls, and other devices suitable for positioning a cursor on a computer monitor 31. The monitor 31 or other kind of display device is connected to the system bus 18 via a video adapter 32.

Often, a graphical image to be displayed on the monitor 31 is stored in a video display memory, which is updated periodically by the CPU to reflect changes to the image resultant from operator commands or application program execution. A video display memory can be allocated as a portion of memory within the RAM 17, or can be a separate memory device such as video display memory 39 associated with a video adapter 32. Typically such approaches to a making a video display memory are structurally and functionally equivalent, although there are certain operational advantages and disadvantages to either approach.

The remote computer 11 in this networked environment is connected to a remote memory storage device 33. This remote memory storage device 33 is typically a large capacity device such as a hard disk drive, CD-ROM drive, magneto-optical drive, or the like. The personal computer 10 is connected to the remote computer 11 by a network interface 34, which is used to communicate over the local area network 12.

As shown in FIG. 3, the personal computer 10 may also connected to the remote computer 11 by a modem 35, which is used to communicate over the wide area network 13, such as the Internet. The modem 35 is connected to the system bus 18 via the serial port interface 30. Although illustrated in FIG. 3 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data files 38 are provided to the personal computer 10 via one of the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is used to store data and programs, including the operating system and programs.

It will further be understood that all or portions of the operating system 36, application programs 37, and data files 38 may be loaded into the RAM 17 from a mass storage medium such as the hard disk drive 20, for access by the CPU. Thus, in discussions which follow pertaining to the computer system's memory, it generally does not matter whether the memory is a mass storage medium such as a hard disk drive 20, or RAM 17, although many data processing operations are intended to operate upon data stored in RAM, to be later stored or saved in a mass storage medium such as the hard disk drive or floppy disk drive.

Preferred Embodiment of Data File

Figure 4A:
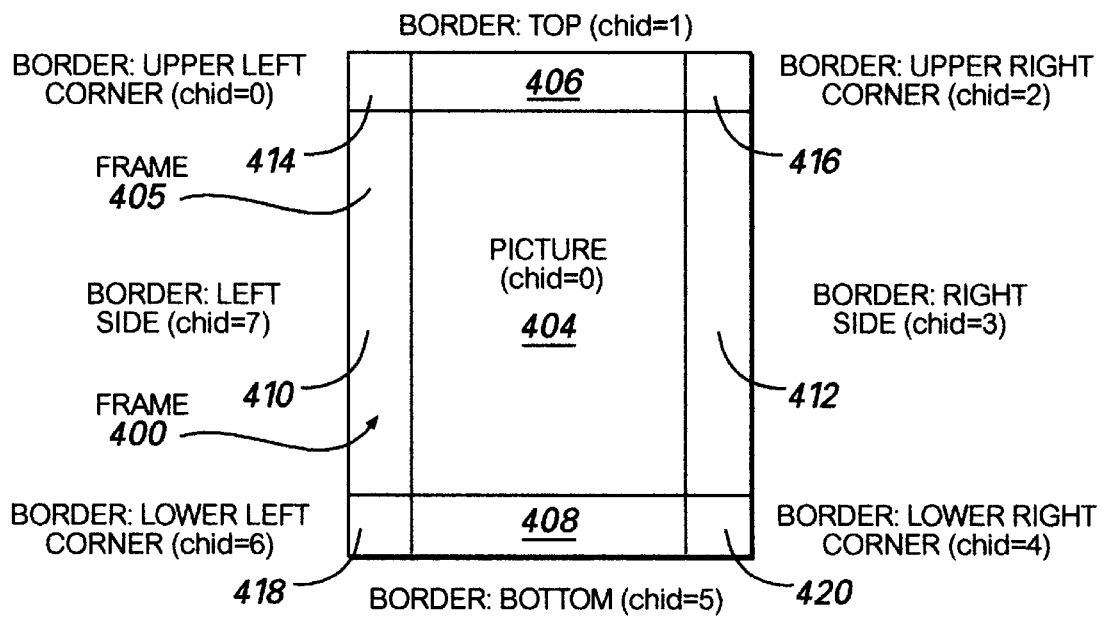
FIG. 4, consisting of FIGS. 4A and 4B, illustrates an exemplary frame graphical object that might be stored in and displayed on the computer system of FIG. 3, and an associated DAG, for which data is stored in accordance with the preferred embodiment of the present invention.

Turning to FIG. 4, next will be described an example of a specific type of data structure, a graphical object to be displayed on the computer's monitor 31, and how such a data structure may be created and stored in accordance with the preferred embodiment of the present invention. In FIG. 4A, there is illustrated a frame 400 that comprises a predetermined region on the computer's monitor for displaying a graphical image. The frame 400 could be a frame within a document of a page layout program, a frame within a graphical editor, etc.

Figure 5A:
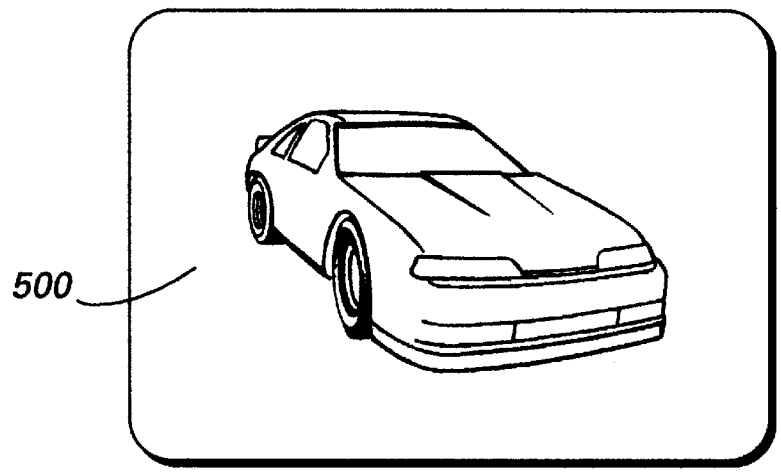
FIG. 5, consisting of FIGS. 5A and 5B, illustrates an exemplary 3D model that might be manipulated in the computer system of FIG. 3 and an associated DAG for which data is stored in accordance with the preferred embodiment of the present invention.
Figure 5B:
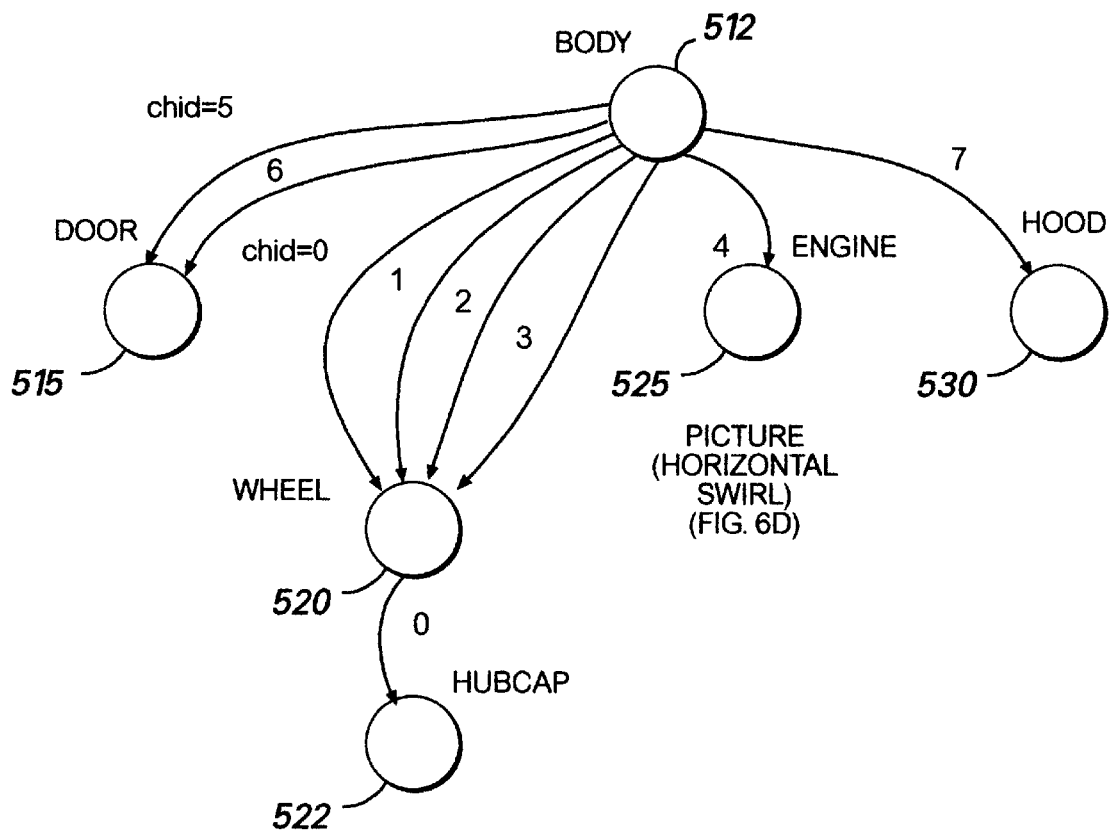

Although the discussion which follows is based on an example of a frame, those skilled in the art will understand that the principles described herein are applicable to any type of computer data file in which data items and relationships between data items are stored. A specific contemplated embodiment is that of a 3D modeling program as shown in FIG. 5, in which nodes represent portions of a 3D model, with child nodes related to one or more parent nodes in a hierarchical relationship.

In the specific example of the frame 400, it is intended that the frame 400 contain a picture 404 and a border 405. The border 405 in turn contains a top border 406, a bottom border 408, a left-side border 410, a right-side border 412, an upper left-hand corner 414, an upper right-hand corner 416, a lower left-hand corner 418, and a lower right-hand corner 420. In order to display the frame 400, an application program operative in accordance with the present invention retrieves the data corresponding to these various data items from the computer system memory, typically loads it into the computer system's random access memory, and moves certain portions of the data into a video display memory associated with the computer system for display on the monitor.

Assume for purposes of understanding FIG. 4 that a command to display frame 400 causes the computer system of FIG. 3 to display all of the types of graphical elements shown in FIG. 4 on the computer system monitor. With this in mind, we turn next to a representation of the data that forms the frame 400 in a computer file stored in the computer system's memory.

Figure 4B:
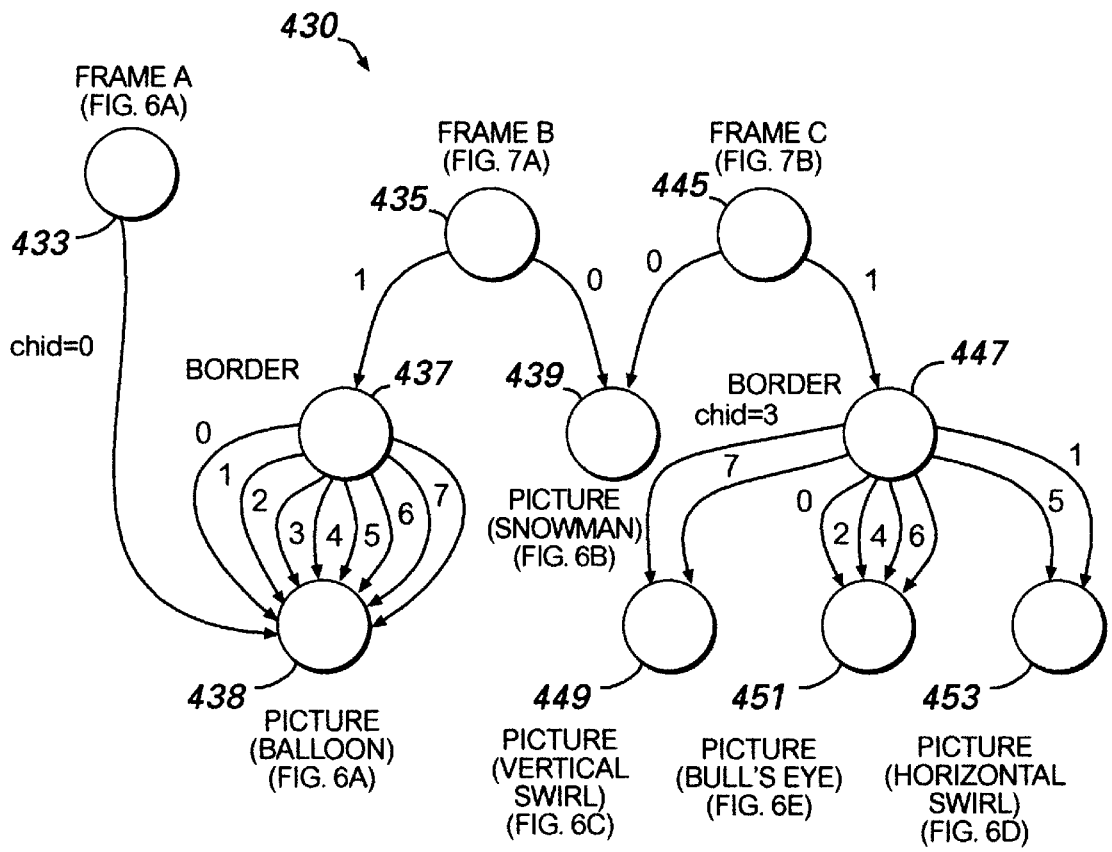

FIG. 4B illustrates a directed acyclic graph 430 that enables the generation and display of several different frames such as the frame 400, designated frames A, B, and C, utilizing the graphical elements as shown in FIGS. 6 and 7. For example, frame A 433 represents the display of the "three balloons" picture shown in FIG. 6A, which is the data item of node 438. In this example, the only child data item of the frame A is a picture of three balloons of FIG. 6A; there are no child data items to represent a border.

Figure 6A:
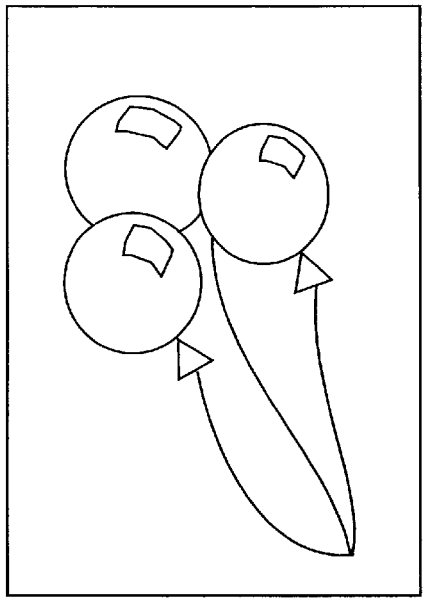
FIG. 6, consisting of FIGS. 6A–6E, are exemplary graphical objects or pictures forming nodes in accordance with the example of FIG. 4.
Figure 7A:
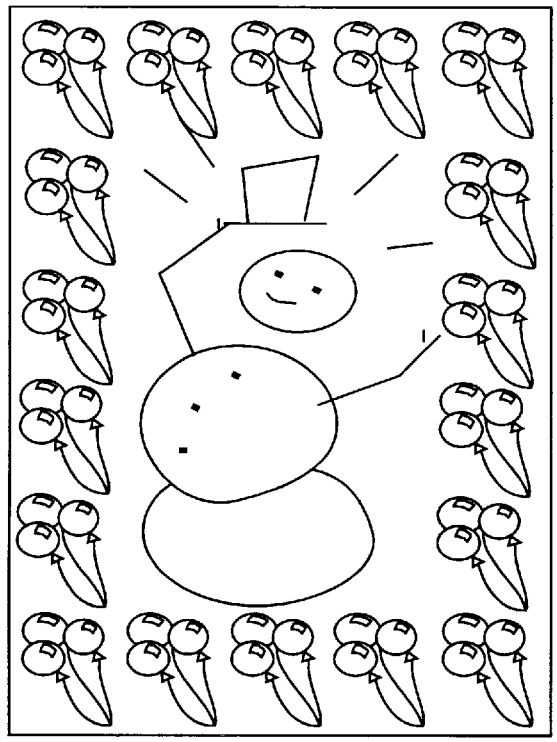
FIG. 7, consisting of FIGS. 7A and 7B, illustrates two different types of frame graphical objects that utilize the graphical objects of FIG. 6 and are related in the manner shown in the DAG of FIG. 4.

Frame B on the other hand represents the arrangement of a snowman picture with balloon borders as in FIG. 7A. Notice that the parent node for frame B 435 has two child nodes—a border node 437 and a picture node 439. The border node 437 contains eight links to the balloon node 438 (FIG. 6A). The picture node 439 is a child of the parent node 435. The multiple relationships from the border node 437 to the balloon node 438 indicates that the balloon picture of FIG. 6A is "owned" eight times by the border node 437, one for each of the top, bottom, and side borders, and each of the four corners.

Figure 7B:
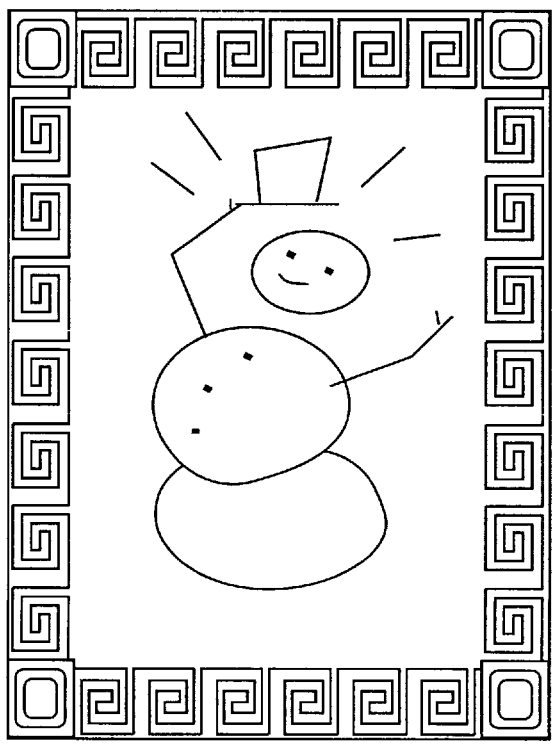

Frame C is represented by the node 445, corresponding to the drawing illustrated of FIG. 7B, a snowman picture surrounded by a top and bottom border horizontal swirl design, a left and right border vertical swirl design, and four "bullseye" corner designs. In accordance with the invention, only a single instance of the horizontal swirl design, the vertical swirl design, and the corner design is stored, even though each of these data items is used multiple times. It will be appreciated that the storage of a single instance of a data item used multiple times as in this example results in increased efficiency in data storage.

Thus, frame C 445 is shown as owning a border node 447 and the snowman picture node 439. The border node 447 is shown with two links to the node 449, indicating two instances of the vertical swirl design of FIG. 6C for the left-side and right-side borders. The border node 447 further has four links to the node 451, corresponding to the "bullseye" image of FIG. 6E, indicating the four corners of FIG. 4A. Finally, the border node 447 has two links to the node 453, corresponding to the horizontal swirl design of FIG. 6D, for the top and bottom borders.

Figure 6B:
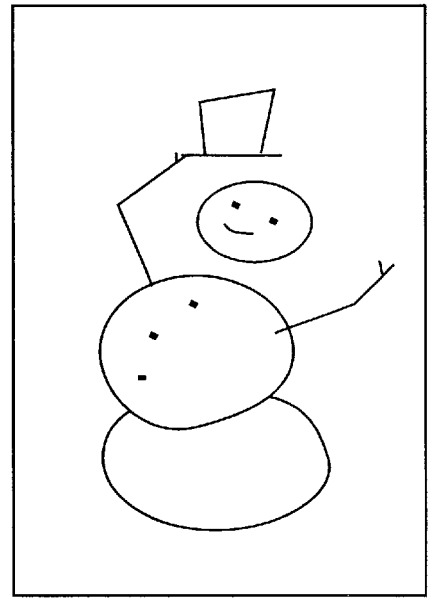
Figure 6C:
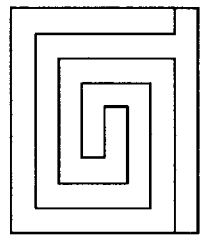
Figure 6D:
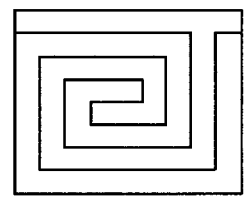
Figure 6E:
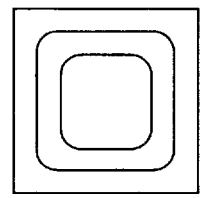

It will therefore be appreciated that frame C 445, which corresponds to the entire graphical image of FIG. 7B, can be generated by the storage of a single instance of the snowman picture of FIG. 6B, a single instance of the vertical swirl pattern of FIG. 6C, a single instance of the horizontal swirl pattern of FIG. 6D, and a single instance of the bullseye picture of FIG. 6E.

Likewise, frame B 435 (corresponding to the graphical image of the snowman surrounded by balloon border, FIG. 7A) can be represented by a single instance of the snowman picture of FIG. 6B and a single instance of the balloon picture of FIG. 6A.

Thus, it will be appreciated that frames A, B, and C can be represented by storing but five picture data items, those of FIGS. 6A–6E, and utilizing the file structure in accordance with the present invention to indicate relationships between these data items. The difference between the frames A, B, and C is the storage of relationship information, rather than multiple storages of the pictures of the balloons, snowman, bull's eye, swirl designs, etc. Indeed, a number of different frames could be generated with the same pictures, merely by manipulating the relationships between the graphical images. The point is that all of these frames can share common data.

The present invention is not limited to pictures or 3D models as data items. The invention is applicable in any data storage and utilization situation in which it is desirable to indicate relationships between data items, especially with a DAG, and when data items can be utilized multiple times. Without limiting the generality of the foregoing, it will be appreciated that the present invention allows creation of file structures where relationships between data items (for example, where a single picture data item is used multiple times) can be exploited for efficient memory storage and utilization.

For example, FIG. 5 illustrates a 3D model 500 of an automobile, as it might be rendered and displayed on computer system's monitor, and a DAG 510 of a file structure employed to represent the model within the computer system's memory. The DAG 500 may employ a top level node 512 corresponding to the automobile body, with child nodes for a door 515, a wheel 520, an engine 525, and a hood 530. In turn, the wheel node 520 has a hubcap node 522. The arcs extending from the body 512 to the various child nodes indicate relationships constructed and represented in accordance with the present invention. It will be appreciated that only a single instance of the door 515 may be needed to represent the left door and right door, albeit the left door is a three-dimensionally reversed version of the door (a mirror image if considered two-dimensionally). Similarly, only a single instance of a wheel 520 is needed even though left and right tires will be displayed differently as a function of position and orientation of the model as a whole. Those skilled in the art will understand how to manipulate three-dimensional data so as to provide for three-dimensional reversing, mirror imaging, position and orientation, etc.

Figure 8:
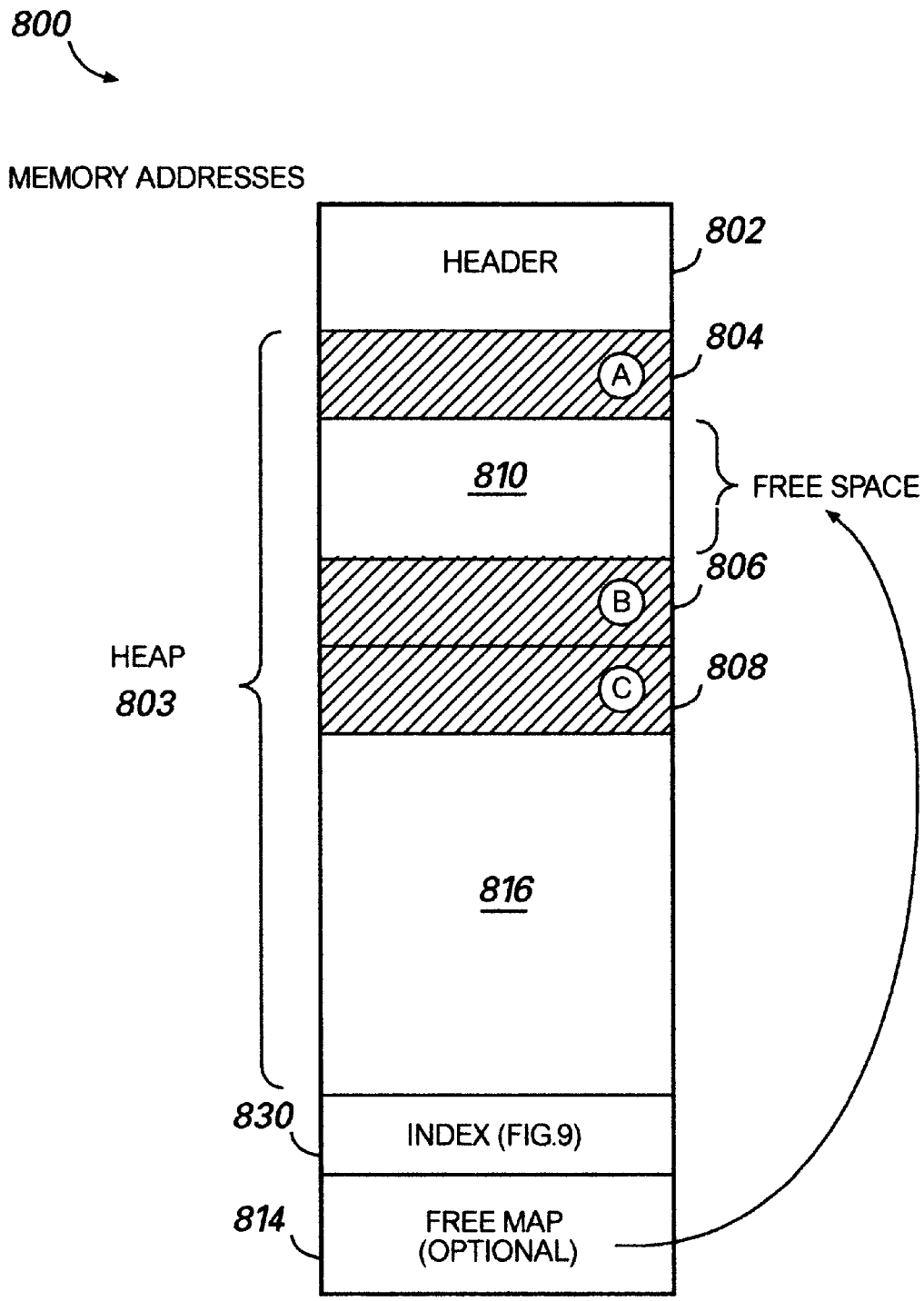
FIG. 8 is a memory map diagram illustrating various components of a data storage file structure constructed in accordance with the preferred embodiment of the present invention.

FIG. 8 is a memory map diagram showing a series of contiguous memory locations representing an exemplary data file 800 constructed in accordance with the present invention, with a header 802, a heap 803 containing one or more discrete nodes such as node A 804, node B 806, node C 808 . . . , an index 830, and an optional free map 814. The heap 803 contains the data for the individual nodes or chunks. The optional free map 814 contains a list of free blocks in the heap 803 that can be utilized for new nodes added to the file if needed by a data processing operation.

It will be understood by those skilled in the art that the diagram illustrates an arrangement of addresses in memory that may be occupied by a data file 800 that is retrieved from a memory storage device or network interface and/or stored within the computer system's RAM memory so that it can be accessed and operated upon by the operating system or an application program.

In the example of the file 800, a predetermined segment of memory is utilized as the header 802 to contain the typical file information such as version number, address of the index, address of the free map, file type, file length, originating application type, date of creation information, date of modification information, and the like.

Subsequent to the header 802 are one or more data nodes in the heap 803 such as represented by the segments 804, 806, and 808, which are also designated by the identifiers A, B, and C. In accordance with the present invention, each of these segments 804, 806, 808, represent a data node such as those shown in the directed acyclic graphs of FIG. 2 or FIG. 4 or FIG. 5. Each of these nodes is a discrete chunk or region of memory typically occupying a series of contiguous memory addresses, and typically containing a single data item such as a picture, a string of text, a series of related numbers, or other information that requires consecutive memory locations.

It will be noted in FIG. 8 that the data node 804 is separated by the data node 806 by a region of free space 810. Further, the region 816, although shown within the heap 803, is unused in the example. Those skilled in the art will understand that regions or "fragments" of free memory within the heap are sometimes created by data processing operations such as deletion. This free space can be utilized if needed by storing newly-created data items in the free space, or the space may remain empty. Those skilled in the art will understand that the data file can be compressed or compacted by an operation that moves data chunks B and C to the contiguous next occurring memory location after the data node 804 in order to reduce the overall storage requirements of the file after a sufficient number of data processing operations that resulted in creation of fragmented memory.

In the preferred embodiment, an optional free map 814 may be incorporated into the file structure to handle the utilization of free memory. The free map 814 may contain a plurality of data entries including pointers to free space such as the regions 810, 816, and information indicating the size of the free space.

The preferred file structure 800 also includes an index 830, which is constructed in the manner described in connection with FIG. 9. The preferred index 830 is a table of entries sorted by node identifier. Each entry in the table contains information relating the various nodes to one another and thereby defining the directed acyclic graph.

Turning in this regard to FIG. 9, the preferred index, such as the index 830, is a data array comprising a sorted table of entries $905a$, $905b$, $905c$, ... $905n$, each entry containing predetermined identifying information related to a particular chunk or node, and reference information indicating the relationship between a given node and zero or more child nodes associated with the given node. The index table shown in FIG. 9 corresponds to the directed acyclic graph shown in FIG. 2. Before discussing the specific aspects of FIG. 2 as implemented in the table of FIG. 9, the structure of the table will first be described.

A first column 910 of the array comprises an array of predetermined data items called "chunk attributes" (CA), which in the preferred embodiment comprises the following items of information:

ctg chunk type or tag
cno chunk number
offset position of data in heap
length size of data in heap
isLoner flag to indicate loner status
numChildren number of children
numParents number of parents
com flag to indicate data is compressed
rti run time ID The chunk attributes CA therefore comprise a number of separate data items for each node in the data file, ordered by a data pair (ctg, cno) in the preferred embodiment. The chunk attributes CA in FIG. 9 correspond to the nodes in FIG. 2, namely, $CA_A$ corresponds to node A, $CA_B$ corresponds to node B, $CA_C$ corresponds to node C, etc.

The chunk type or tag ctg relates to information indicative of the data type, for example, a frame, a border, a picture item, a text data item, or the like. It will be understood that virtually any type of node can be associated with child nodes. However, certain types of nodes are more likely to have child nodes than others, e.g., a frame node (as in the example of FIG. 4) is likely to have one or more child nodes forming the images to be displayed in the frame. On the other hand, a picture node (as in the picture of the balloon in FIG. 6A) is not as likely to contain child nodes. Nonetheless, it will be understood that any node can be a data item and can also have child nodes.

The chunk number cno is utilized to differentiate chunks of similar type (i.e., the same ctg) with an identifying number. Each chunk or node is therefore uniquely referenced within a given file by a chunk tag cto and a chunk number cno.

It should be noted at this juncture that when a node is copied from one file to another, its type information ctg is always preserved but its number cno might not be preserved. For example, if the destination file already contains a node having the same type and number ctg, cno, a new cno will be assigned to the destination node.

Still referring to FIG. 9. in addition to the chunk attributes CA, an index entry 905 for a given node comprises a list of its children. in the form of triples of data items (ctg, cno, chid), where ctg and cno are as defined above, and the data item chid is a "child identifier" or "child ID". There is a separate data item, e.g. item 908 for each child node associated with a parent node, with the parent node indicated by the $CA_n$ entry.

To illustrate these concepts, refer now to FIG. 2 in conjunction with FIG. 9. As the first example, consider the node A in FIG. 2, which has a four times multiple relationship to node E, and two additional child nodes F and G. Thus, the child list in FIG. 9 shows that the node A has six children identified by the data item triples ($ctg_E$, $cno_E$, 1), ($ctg_E$, $cno_E$, 2), ($ctg_E$, $cno_E$, 3), ($ctg_E$, $cno_E$, 4), ($ctg_F$, $cno_F$, 1), ($ctg_G$, $cno_G$, 1), where the subscripts indicate association with child nodes. The chunk attributes $CA_A$ for the node A contain the corresponding data items (ctg, cno, off, length, isLoner, numParents, numChildren, com, rti).

The child list contains the data item triples (ctg, cno, chid), which are graphically represented as a single letter associated with the node in FIG. 2. The chid of each parent/child relationship is indicated by the number placed in proximity to the arc extending from the parent nodes to the associated child nodes. Note in this regard that the chid for node E as a child of node A varies from 1 to 4, indicating the multiple utilization of node E by node A, while the remaining child nodes of A have a chid value of 1.

Note that the child IDs do not have to be sequential, or begin with one. The numbers merely need to be different for the same node.

Referring back a moment to FIG. 4, a chid specifies how a child node is used. For example, in the frame/border/picture example of FIG. 4, a particular chid, say chid=0, indicates the contents (picture or text) of the frame. A different chid, say chid=1, indicates a border. For the border/picture hierarchy shown in FIG. 4, chid=0 indicates the top left corner, chid=1 indicates the top border, chid=2 indicates the top right corner, etc.

In the DAG of FIG. 5, a chid=0 for the body indicates left front wheel, chid=1 indicates right front wheel, chid=2 indicates left rear wheel, and chid=3 indicates right rear wheel. Likewise, chid=5 indicates right door, and chid=6 indicates a left door. For a wheel node, a chid value of 0 indicates a hubcap.

It will therefore be appreciated that the chid provides an indicator as to usage of a node, where a predetermined chid value indicates a predetermined usage.

Turning next to FIGS. 10–15, various data processing operations of (1) add a node, (2) add a parent/child relationship, (3) delete a parent/child relationship, (4) delete a node, (5) clone a subgraph, and (6) copy a subgraph will be described in conjunction with exemplary DAGs, together with specific computer-implemented steps for carrying these out in the preferred computer system. Although a predetermined set of six data processing operations are described, those skilled in the art will understand that these are merely exemplary operations for purposes of explaining the invention, and that other data processing operations will occur to those skilled in the art. Further, there are other data processing operations such as set loner flag, resize chunk data, etc., the details of which will be understood by those skilled in the art after the discussion which follows.

Figure 10:
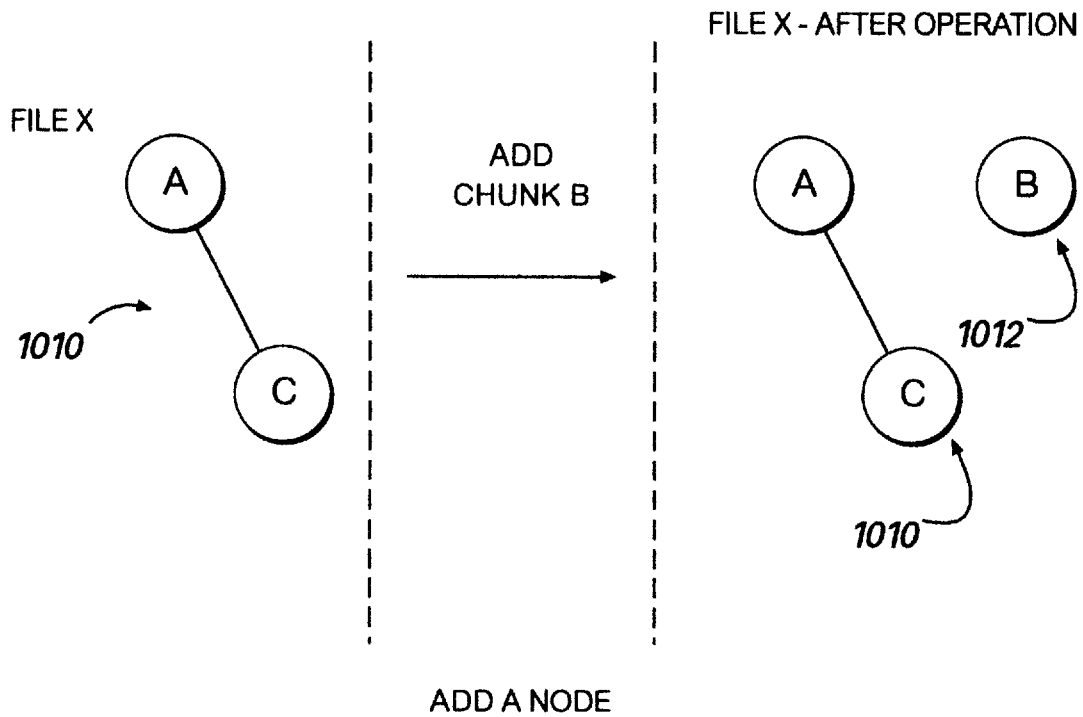
FIG. 10 is an exemplary directed acyclic graph and pseudocode listing for an "add node" data processing operation.

FIG. 10 illustrates simplified directed acyclic graph of a file X, before and after the operation of adding a node. The DAG 1010 prior to the operation shows the file X as comprising a preexisting parent node A having a single child node C. It is assumed that when the file is initially set up, file X will contain two data nodes A and C, with the index (FIG. 9) containing a child list indicating a parent/child relationship between node A and node C.

The operation of "add node" assumes that a new node B is added to the structure of file X, but without establishment of any relationship between the node B and any other nodes. Thus, after the operation, file X comprises nodes A and C related in a parent/child relationship, and node B.

FIG. 10 also contains a pseudocode program listing for computer-implemented steps to carry out the previously described operation of "add a node". The "add a node" function requires establishment of values for ctg, cno, and length for data represented by a newly created or added node B.

The first step taken is to allocate a contiguous block of memory of "length" bytes from the heap of FIG. 8, for example, the block 808. The next step taken is to insert an entry into the index of FIG. 9 for the newly created node, in the form of CA(ctg, cno). Then, the remaining chunk attribute values CA for the node, in this case node B, are filled in with correct information.

After these steps, the file X will contain data corresponding to the node B in the appropriate region of memory, e.g. block 808, and the index associated with file X will reflect the existence of node B. In this particular example, since there is no parent/child relationship, there will be no entries in the child list, because there are no references to any child nodes. The DAG will comprise the original DAG 1010, and an (as-yet) unrelated node B 1012.

Figure 11:
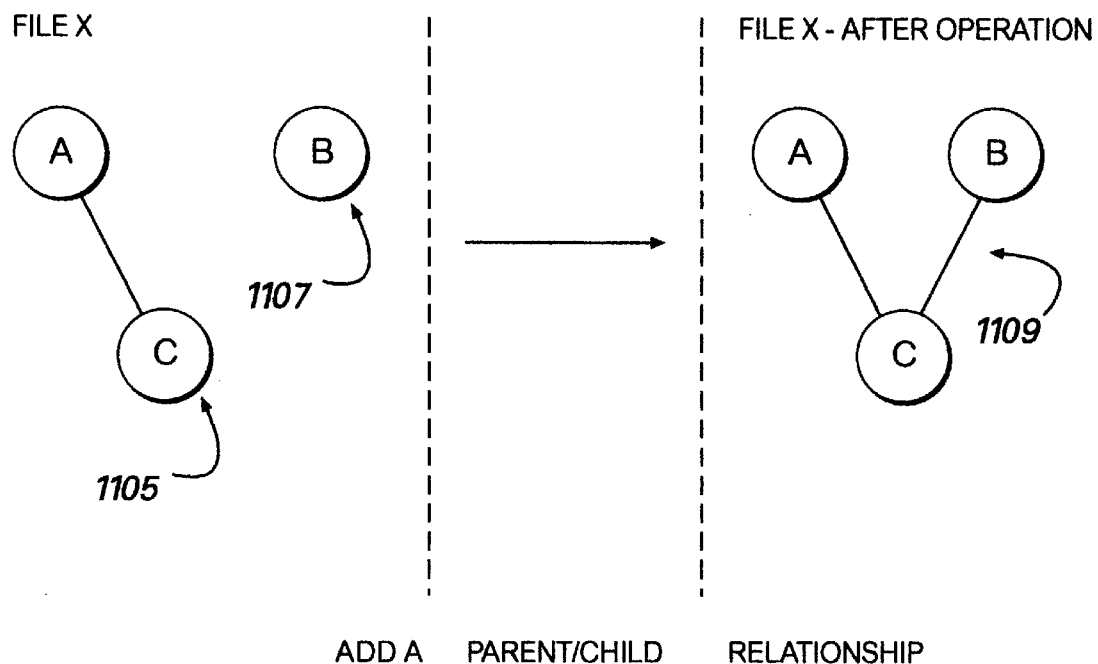
FIG. 11 is an exemplary directed acyclic graph and pseudocode listing for an "add a parent/child relationship" data processing operation.

FIG. 11 illustrates simplified directed acyclic graphs of an exemplary file X, before and after the operation of adding a parent/child relationship. The DAG 1105 prior to the operation shows the file X as comprising a preexisting parent node A having a single child node C, and a data node B 1107 that is (as-yet) unrelated to any other node.

The operation of "add a parent/child relationship" assumes that the node B exists in the structure of the file X and that node C is to be established as a child of node B. Thus, after the operation, file X comprises nodes A and C related in a parent/child relationship, and nodes B and C also related in a parent/child relationship, with the resultant DAG as shown at 1109.

FIG. 11 also contains a pseudocode program listing for computer-implemented steps to carry out the previously described operation of "add a parent/child relationship". The function AddParentChild requires (1) provision of the chunk type ctg and chunk number cno of the parent, (2) provision of the chunk type ctg and chunk number cno of the child for which the relationship is to be established, and (3) determination of an appropriate chid.

The first step taken is to locate the chunk attributes CA for the parent in the index of FIG. 9. Then, the appropriate ctg and cno of the child node (ctgChd, cnoChd), and the chid are established by creating an entry in the child list in the index for the parent node. Next, the chunk attribute CA.numChildren (the number of children) of the parent node is incremented to indicate that this particular parent node contains an additional child. Next, the chunk attributes CA for the child is found in the index, and the value of CA.numParents (the number of parents) is incremented to indicate that this particular child node now has an additional parent.

After these operations, the DAG in the exemplary file X as shown in FIG. 11 will appear as shown at 1109, with an arc extended between node B and node C to indicate the parent/child relationship.

FIG. 12 illustrates simplified directed acyclic graphs of a file X, before and after the operation of deleting a parent/child relationship. The DAG 1205 prior to the operation shows the file X as comprising a preexisting node A having a single child node C and a parent node B having a child node C.

For purposes of discussion, the operation of "Delete parent/child relationship" assumes that the link between a parent node, e.g. node B, and a child node, e.g. node C, is severed, without deleting the data for either node. After the operation, file X comprises nodes A and C related in a parent/child relationship as shown in the DAG 1207, and node B 1209, without any parent/child relationship.

FIG. 12 also contains a pseudocode program listing for computer-implemented steps to carry out the previously described operation of "delete parent/child relationship". The function DeleteParentChild also involves the ctg and cno values for both the parent and child nodes, and the chid. The first step taken is to find the chunk attributes of the parent, with the operation find CA(ctgPar, cnoPar). Next, the entry in the child list for this particular parent is deleted. Then, the variable CA.numChildren (the number of children associated with the parent node) is decremented to indicate that this parent now has one fewer children.

The next step taken is to find the chunk attributes of the child node. Then, the value of the variable CA.numParents (the number of parents of the child node) is decremented to indicate one fewer parent is now associated with this particular child node.

The next step taken is to delete the data for the child node under certain conditions. If the node has no more parents, and is also not a loner node, then the data for this node is deleted. Thus, the inquiry is made whether CA.numParents of the child node is zero and CA.isLoner is false. If these conditions are satisfied, the function _DeleteCore is carried out.

Still referring to FIG. 12, the function _DeleteCore is a helper function for the "delete a node" function, described below, and the "delete a parent child relation" function (DeleteParentChild). The first step of _DeleteCore is to find the chunk attributes for the node upon which the operation is to be carried out. For each child of the node in question, the function DeleteParentChild is recursively carried out so as to break the parent/child relations for all of the nodes in the hierarchy. As described above, this results in deletion of the data for the nodes if the loner flag CA.isLoner is false and there are no parents of the node, as indicated by CA.numParents being zero.

Next, the memory previously occupied by the node's data is added to the free map 814 in FIG. 8 to indicate that there is free space available that was formerly occupied by the data for the node. Finally, the chunk attributes CA for the node in question are deleted from the index.

Figure 13:
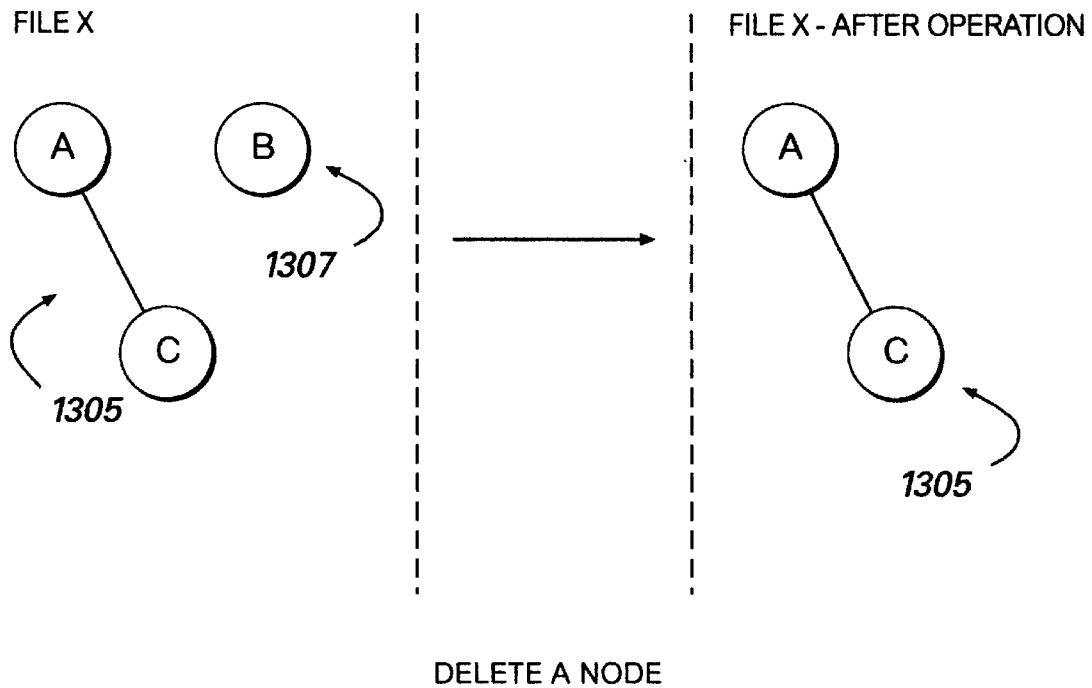
FIG. 13 is an exemplary directed acyclic graph and pseudocode listing for a "delete a note" data processing operation.

FIG. 13 illustrates a simplified directed acyclic graph of a file X, before and after the operation of deleting a node. The DAG prior to the operation shows the file X as comprising a preexisting parent node A having a single child node C 1305, and a node B 1307.

The operation of "delete a node" assumes that the node B and its data is to be deleted from the structure of file X. This function is typically carried out when the data for a particular node is no longer required in the file and should be eliminated from the file, provided that there are no preexisting parent/child relationships. If a node and its data is to be deleted, then by definition it is not a "loner" that should remain, so the loner flag CA.isLoner is set to false. If the data for a file should remain, unrelated to any other nodes, then CA.isLoner would be set to true.

The Delete function requires provision of a ctg and cno for the node to be deleted. First, the chunk attributes for the node are found in the index of FIG. 9. Then, the loner flag (CA.isLoner) is set to false to indicate that the node is no longer required. If the node has no parents, as indicated by CA.numParents being zero, the function _DeleteCore is called as described above. The _DeleteCore function is called recursively, so as to delete the parent/child relationships of any child nodes associated with the node to be deleted, and to delete their data if the appropriate conditions are satisfied, as described above.

FIG. 14 illustrates a simplified directed acyclic graph of a file X, before and after the operation of cloning a subgraph. The DAG 1405 prior to the operation shows the file X as comprising a preexisting parent node A having two child nodes B and C, with both nodes B and C having a common child node D. The clone operation duplicates a subgraph in a source file X to a destination file Y without using existing nodes or altering the relationships therebetween. The destination file Y may be one and the same as the source file X. The operation effectively duplicates a subgraph and its data. If the operation is carried out within a single file, that is, if the destination file is the same as the source file, the result is creation of two identical subgraphs with duplicated data. If the destination file is distinct from the source file, the result is to create an identical subgraph within the destination file.

Thus, as shown in FIG. 14, after the operation a second, duplicate subgraph as indicated at 1411, with nodes A', B', C', and D', related in the same fashion as the original subgraph 1405 with nodes A, B, C, and D is created. If the destination file Y is one and the same as the source file X, both the original subgraph 1405 and the duplicate subgraph 1411 are in file X. If the destination file Y is distinct from the source file X, the duplicate subgraph 1411 is created within the file Y.

The clone operation (and the copy operation, to be described later) both utilize a mapping list, which contains elements of type MAP. Each MAP element has data values for a source (ctg, cnoSrc), and a destination (cnoDst). The ctg of the destination is always the same as the ctg of the source, so is not stored explicitly. The mapping list is utilized to keep track of which source nodes have been copied to which destination nodes. This is needed in the case when a source node is a child a multiplicity of times of one or more other source nodes. In such a case a single destination node should be created for the source node and this destination node should be used whenever the source node is encountered in the clone or copy algorithm. In other words, a source node should only be duplicated once regardless of how many times it is encountered in traversing the source subgraph.

FIG. 14 also contains a pseudocode program listing for computer-implemented steps to carry out the previously described operation of "clone a subgraph". The Clone operator requires values of ctg, cno, and the identification of a destination file in which the clone operation should take place, indicated by the identifier fileDst. The function returns the value of the chunk number cno of the node cloned.

Assume for purposes of the following discussion that the subgraph 1405 in FIG. 14 is to be cloned. In order to clone a subgraph, a node and its children are recursively copied and parallel parent/child relationships are established.

The first step taken is to create a mapping list containing no entries. Once a source node is cloned into the destination file, a map entry for the node is added to the mapping list. That is, there will be a map entry with ctg and cnoSrc equal to the ctg and cno of the source node and cnoDst equal to the cno of the corresponding destination node.

Then, the function _CloneCore is called recursively, with the variables ctg, cno, fileDst, and the mapping list. The _CloneCore function returns the cno of the destination chunk. The first step taken is to inspect the entries in the MAP list to determine if there is an entry already containing the same ctg and cno as the node being copied. If so, the cno of the destination chunk is returned by returning the value of MAP.cnoDst.

As described, the first node cloned (node A in the example) will have no entry in the map list, so the condition will not be satisfied on the first call to _CloneCore, but may be on later calls.

(Jumping ahead a bit, it should be understood that after several iterations the subgraph 1407, which contains node D', will be copied. When node C is cloned and the map list is inspected, this step will reveal that a child of node C, namely node D, has already been copied and exists in the destination file as node D'. Thus, the map list will contain an entry containing (ctgD, cnoSrcD, cnoDstD), where the "D" subscript indicates node D. This entry signifies that node D was already cloned and need not be cloned again.)

Next, the chunk attributes for the node to be cloned are obtained.

If the destination file contains no node with name (ctg, cno), cnoDst is set equal to cno. In this case the source and destination nodes have the same cno value. If, on the other hand, the destination file already contains a node with name (ctg, cno), a value is selected for cnoDst so that the destination file does not contain a node with name (ctg, cnoDst). It should be appreciated that in either case, there is no node in the destination file having name (ctg, cnoDst). The next step taken is to call the Add function for the destination file so as to add the node with name (ctg, cnoDst) to the index for the destination file. This is reflected by the call to fileDst.Add. Then, the appropriate data for the node is copied to the memory allocated by the Add function, and the relevant node attributes for the node (including the rti, to be discussed later) are copied into the index for the destination file.

Then, an appropriate MAP entry containing (ctg, cno, cnoDst) is created and added to the mapping list to indicate that the source node has been copied to the destination file.

Next, for each child of the source node, _CloneCore is called recursively to clone the child node in the destination file and AddParentChild is called on the destination file to establish the parent/child relationship between the destination node and the destination child node. It should be appreciated that the parent/child relationship in the destination file is assigned the same chid value as the parent/child relationship in the source file.

After these operations, the _CloneCore operator returns the cno value of the destination node.

From the foregoing, and still referring to FIG. 14, the structure of the DAG shown at 1407, 1409, and 1411 will now be understood. When the node A is cloned, the effect of recursion is to copy the subgraph 1407. After completion of cloning the left hand branch of the subgraph 1405 (node A', B', and D'), the recursive operation will clone node C to obtain node C' 1409. The operation will determine that node C has a child node D which has already been cloned to node D'. The existence of node D' will be found in the map list. Accordingly, the operation will result in the establishment of the parent/child relationship between node C' and node D'. The recursive call to clone C will then be complete and returning to the previous call, the operation will establish the parent/child relationship between node A' and node C'. The resultant subgraph is indicated at 1411.

FIG. 15 illustrates simplified directed acyclic graphs of an exemplary file X and an exemplary file Y resulting from the operation of "copy a subgraph" operation. The "copy" operation differs from the "clone" operation described above in that the copy operation will search for and utilize existing nodes in a destination file if possible (to prevent unnecessary data duplication), while a clone operation will duplicate a subgraph and its nodes without regard to whether the subgraph or any of its nodes already exists in the destination file.

In the copy operation, the subgraph to be copied is in an identified source file, e.g. file X, and the copy operation is effected in a destination file, e.g. file Y in the example of FIG. 15. The source file X contains a DAG 1505 comprising a preexisting parent node A having child nodes B and C, and the child nodes B and C have a common child node D. Assume that the destination file Y already contains the nodes C' and D' 1507, which were created by a previous Copy operation which copied nodes C and D to nodes C' and D'. Note that since D is a child of C, D' was made a child of C' by the previous copy operation.

The operation of "copy node" in FIG. 15 is shown in two phases. First, nodes A and B on the left hand branch of the DAG 1505 are copied into the file Y. When this is complete, file Y contains the graph 1509. Note that B' is now a parent of node D', since D' was determined to be an exact copy of source node D. When the right hand branch of node A is inspected, the operation determines that the next child of node A (node C) has already been copied to node C' in file Y. Accordingly, the data for node C is not copied. Rather, the appropriate parent/child relationship is established, resulting in the DAG 1511.

The run time ID (rti) attribute is utilized to indicate and ascertain that a node has been copied. In the disclosed embodiment, the first time a source node is copied from one file to another with a copy or clone operation, it is assigned a unique non-zero rti. The destination node of this and all subsequent copy or clone operations on this source node are assigned the same rti to reflect that they are copies of the original source node. The rti remains for as long as the file is open. When a file is closed and re-opened each node in the file is assigned a zero rti, indicating that it has not yet been copied. An alternative implementation is to assign each node a globally unique identifier when it is first copied. Such globally unique identifiers could be saved in the file and re-used when the file is closed and re-opened. Assigning and comparing globally unique identifiers is much more time consuming that assigning and comparing run time identifiers (that are only unique within the context of a running program) so we use the latter in this discussion, recognizing that one who is skilled in the art can implement the same algorithm using globally unique identifiers.

FIG. 15 also contains a pseudocode program listing for computer-implemented steps to carry out the previously described operation of "copy node". The copy operation copies a DAG subgraph, using existing nodes when possible. The function returns the cno of the destination node. The copy operator Copy requires variables (ctg, cno, fileDst) which identify a node and its subgraph to be copied and the destination file.

The first step taken of the Copy operation is to determine if the destination file is the same as the source file. As in the clone operation, the destination file can be the same file as the source file (e.g. file X) or can be a different file (e.g. file Y). The example of FIG. 15 shows that the destination file is different from the source file, but those skilled in the art will understand that the source and destination files can be the same.

If the destination file is the same as the source file, the cno for the node represented by ctg, cno is returned and the operation is completed as the source subgraph is a suitable copy of itself. Otherwise, the algorithm continues by creating a mapping list with no entries and calling the function _CopyCore to cause the copying of the node and any associated children, if necessary, to the destination file.

The core copy operation _CopyCore returns the cno of the destination node in the destination file. The _CloneCore operation (FIG. 14) and the steps of the CantShare portion of the _CopyCore operation pseudocode (FIG. 15) are similar. A principal difference between _CloneCore and _CopyCore lies in the determination that a particular node has been copied by a previous Copy or Clone operation, so that it is not recopied.

The first step taken is to inspect the mapping list to determine if the list contains a map entry for the node being copied. The first time a node is encountered, it will have no entry in the mapping list. Once a node has been copied there will be a map entry reflecting that the node has been copied, which is utilized deeper into the recursion to prevent unnecessary copying.

If there is a map entry for the node being copied, the cno of the node in the destination file is returned, as MAP.cnoDst.

Next, the chunk attributes for the node to be copied are obtained. The rti attribute of the node being copied is inspected to determine if it is zero. If the rti is zero, the value of CA.rti is set to the next available unique rti and the program branches to the steps indicated as CantShare. The CantShare portion, as described below, results in return of cnoDst as the cno for the node copied.

As mentioned earlier, the rti value, also called a "run time ID", is a unique identifier utilized in conjunction with the copy operation. The rti is zero for a node if the node has never been copied, and has a predetermined unique value if the node has been copied at least once. In the disclosed embodiment, the number is a global variable that persists for the life of a program that utilizes a file structure constructed in accordance with the present invention. In the disclosed embodiment, a 32-bit integer is utilized for the rti, which permits up to 4 billion distinct nodes to be copied. Those skilled in the art will appreciate that more or fewer bits can be utilized for the rti, if desired.

All newly created nodes are assigned an rti value of zero, indicating that these new nodes have never been copied. The first time a node is copied to another file, it is assigned a non-zero rti. If two nodes have the same non-zero rti, it indicates that the data of the two nodes is identical. There may be different relationships between various nodes, as indicated by parent/child relationships stored in the index, but the data in two nodes with the same rti is the same byte for byte.

If the subgraphs of two nodes are also identical (e.g. there are the same number of children nodes and the rti's of the children match and so on recursively), then the subgraphs are effectively equivalent.

Accordingly, and returning now to the pseudocode of FIG. 15, if the CA.rti of the node being copied already has a non-zero value, the destination file is searched for nodes with the same rti value. For each such node, steps are taken to determine if the subgraphs of the node being copied and the node in the destination file with the same rti are equivalent. If so, a map entry MAP(ctg, cno, cnoDst) is created to indicate, for deeper recursion levels, that the node being handled already exists. Then, the cno of the destination node is returned.

It should be understood that the process of determining if the subgraphs of a node being copied and a node in the destination file with the same rti are equivalent involves recursively checking that a node indicated by (ctg, cno) has the same number of children as fileDst(ctg, cnoDst), have the same chid values (to indicate the same usage) for corresponding children, that corresponding children have the same non-zero rti values, and that such children have equivalent subgraphs (recursion). If at any point any of these conditions are not satisfied, the subgraphs are not equivalent.

Upon returning to any given recursion level of _CopyCore, the index of the destination file will contain appropriate relationships between a node being copied and any preexisting nodes (and their subgraphs) in the destination file.

The CantShare steps are carried out to copy data and relevant node attributes (including the rti value) from the source file to the destination file for nodes that have not been copied before. These steps are only carried out when it is determined by the preceding steps that a particular node has not been copied previously to the destination file and must be copied in its entirety—data and relationships.

If the ctg, cno values of the node to be copied already exist in the destination file fileDst, then a new cno is chosen for use in the destination file. But if the ctg, cno values do not exist, the same cno as the source file node may be used, so cnoDst is set to the cno of the source file.

Next, steps are called for copying the node and establishing the corresponding parent/child relationships. These steps are substantially the same as described above in connection with the _CloneCore operation. The steps are indicated as shown by the operator fileDst.Add(ctg, cnoDst, CA.length), which creates a new node in the destination file. Then, the data for the node as well as relevant chunk attributes including the rti are copied into the destination file. A MAP entry is created and added to the map list. Next, for each child in the child list of the node in question, the _CopyCore routine is called recursively to obtain appropriate cno values. Finally, the operator of AddParentChild is carried out in the destination file to establish corresponding parent/child relationships.

With the foregoing examples and pseudocode in mind, those skilled in the art will understand how a computer system as illustrated in FIG. 3 utilizes the principles of the present invention. The processes indicated by the pseudocode listing comprises a number of computer-implemented operations that can be effected from within an operating system program module or an application program module, to carry out data processing operations that affect the relationship between data nodes in a data file constructed in accordance with the preferred embodiment of the invention. Although the examples given are in the context of add node, add parent/child relationship, delete parent/child relationship, clone, and copy routines, those skilled in the art will understand that the routines or operations described are exemplary, and that other types of data processing operations are deemed equivalent and in accordance with the present invention.

From the foregoing, those skilled in the art will now understand and appreciate that the file system described herein supports the number of properties in operation. Firstly, a given node or chunk of data can own any number of other chunks. The identification number (chid) stored with each ownership link is specified and used to distinguish between children of a single node. A chunk or node can be owned by more than one chunk, thereby permitting multiple ownership relationships. A node can own another chunk with any number of distinct chid values. A chid value can indicate usage of a node.

When a node is copied to another file with a "copy" operation, all child chunks, if they do not previously exist, are copied and linked to their parents automatically, and will contain the same chid values. That is, if X:A has a child X:B, and X:A is copied as chunk Y:A in a separate file Y, then X:B is similarly copied to a chunk Y:B and Y:A has a child node Y:B. This property is recursive, so that if X:A has child X:B and X:B has child X:C, and X:A is copied to Y, then Y will end up with nodes Y:A, Y:B, and Y:C, such that Y:A has child Y:B, and Y:B has child Y:C.

It will also be appreciated that chunks are shared across copy operations. If X:A has child X:C and X:B has child X:C, and X:A is copied to Y:A and X:B is copied to Y:B, then Y will contain a chunk Y:C such that Y:A has child Y:C and Y:B has child Y:C. This sharing is only required as long as both files remain open. If one or both files are closed and reopened between the copy operations so that the identity between nodes is not observable, the second copy operation may create Y:D, a copy of X:C, such that Y:B has child Y:D. The sharing will also not occur if either chunk X:C or Y:C is changed in any way between copy operations, so that they are no longer identical.

It will be further appreciated that nodes or chunks can have the loner attribute. All chunks that have no parents must be loners. Chunks that have parents can also be loners. When the last parent of a non-loner node is deleted, it is also deleted.

Finally, the clone operation can clone a chunk into the same or a different file.

Accordingly, methods and systems for storing information in a computer system memory using a directed acyclic graph structure with related data nodes have been described.

In accordance with the principles of the invention, data nodes or chunks that are used repeatedly within a data file associated with a given computer application program are stored efficiently and memory is conserved. The principles of the present invention are also readily applicable to virtually any type of computer application, such as word processors, data bases, 3D modeling and rendering programs, animation programs, spreadsheets, graphics programs, etc. Accordingly, other uses and modifications of the present invention will be apparent to those skilled in the art without departing from the scope and spirit of the present invention, and all of such uses and modifications are intended to fall within the scope of the appended claims.

What is claimed is:

1. A method for storing and presenting information in a computer system, comprising the steps of:
   creating a plurality of data nodes defining frame data playable or displayable on a user interface;
   storing instances of data nodes in a data file in a computer memory;
   linking the stored instances of the data nodes in a directed acyclic graph structure defining a plurality of parent and child objects in which each child object is linked to a plurality of parent objects; and
   displaying or playing the frame data on the user interface such that the stored instance of each child object is displayed or played in association with more than one parent object.

2. The method of claim 1, wherein the frame data comprises an element selected from the group consisting essentially of a picture, a representation of a three-dimensional object, a sound, a text string, a video, a sprite, and alphanumeric data.

3. The method of claim 2, wherein the data file comprises:
   a header for storing file information;
   a heap comprising a plurality of segments containing the frame data; and an index.

4. The method of claim 3, wherein the file information includes a version number, an address of the index storing a representation of the directed acyclic graph, a file type, a file length, an origination application type, a date of creation, and a date of modification.

5. The method of claim 3, further comprising a free map segment comprising a plurality of data entries selected from the group comprising pointers to free segments in the heap, and information stating the size of the free segments.

6. The method of claim 3, wherein the index comprises a two-dimensional array having a plurality rows, wherein each row corresponds to an associated one of the data nodes and comprises:
   a first column containing chunk attributes for the associated data node; and
   a second column comprising a list of child objects linked to the associated data node.

7. The method of claim 6, wherein chunk attributes are selected from the group consisting essentially of a chunk type, a chunk number, an offset, a length, a lower status flag, a number of children, a number of parent, a data compression flag, and run time ID.

8. The method of claim 6, wherein the child object list contains attributes selected from the group consisting essentially of a chunk type, a chunk number, and a child ID.

9. The method of claim 6, further comprising steps for carrying out a create object operation for adding a new parent and/or child object to the data file, comprising the steps of:
   allocating a block of memory in the heap for storing information associated with the new object;
   creating a new row in the index for the new object;
   storing chunk attributes for the new object in the new index row; and
   storing the information associated with the new object in the block of memory.

10. The method of claim 6, further comprising steps for carrying out an add parent/child relationship to the data file, comprising the steps of:
   locating a row in the index associated with a parent object for the parent/child relationship;
   creating an entry in the child list for the parent object identifying a child object for the parent/child relationship;
   incrementing a child object counter in the index for the parent object; and
   incrementing a parent object counter in the index for the child object.

11. The method of claim 6, further comprising steps for carrying out a delete object operation for deleting an object in the data file, comprising the steps of:
   locating a row in the index associated with the object to be deleted;
   examining a parent object counter associated with the object to be deleted, and
   in response to the parent object counter being non zero, recursively deleting a parent/child relationship and decrementing the parent object counter for object to be deleted until the parent object counter is equal to zero; and
   in response to the parent object counter being zero, deleting the row in the index associated with the object to be deleted.

12. The method of claim 6, further comprising the steps for carrying out a clone object operation for duplicating objects and their hierarchical relationships from a source file to a destination file without utilizing preexisting objects in the destination file, comprising the steps of:
   determining whether an entry for an object to be cloned exists in the index of the destination file;
   in response to determining that an entry for the object to be cloned exists in the index of the destination file, establishing a different entry in the index of the destination file for the object to be cloned;
   in response to determining that no entry for the object to be cloned exists in the index of the destination file, utilizing the entry in the index of the source file associated with the object to be cloned; and
   performing a create object operation to add information corresponding to the object in to be cloned as a new object in the destination file.

13. The method of claim 12, wherein the step for carrying out a create object operation comprises the steps of:
   allocating a contiguous block of memory in the destination file;
   creating a new entry in the index for the new object in the destination file;
   storing attributes associated with the object in the new entry index.

14. The method of claim 13, further comprising the steps of carrying out in the destination file the cloning operation recursively for each child object associated with the object to be cloned.

15. The method of claim 13, further comprising the steps of determining whether an object to be cloned has previously been copied during the cloning operation, and if it has, using the previously created copy in establishing the hierarchical relationship.

16. The method of claim 6, further comprising the step for carrying out a copy operation for duplicating objects and their hierarchical relationships from a source file to a destination file utilizing at least one preexisting objects in the destination file, comprising the steps of:

examining the value of a run time ID attribute associated with the object to be copied;

establishing a unique run time ID attribute if the object to be copied does not have a run time ID attributes;

if the object has a run time ID attribute, examining the run time ID attribute in the destination file to determine whether the object to be copied corresponds to a preexisting object in the destination file;

in response to a determination that the object to be copied corresponds to the preexisting object in the destination file, utilizing the preexisting object as the copy;

in response to a determination that there is no corresponding preexisting object in the destination file, executing steps for cloning the object to be copied from the source file to the destination file.

* * * * *